US009352286B2

(12) United States Patent
Na et al.

(10) Patent No.: US 9,352,286 B2
(45) Date of Patent: May 31, 2016

(54) COMPOSITE FILTRATION MEMBRANES AND METHODS OF PREPARATION THEREOF

(71) Applicant: GlobalFoundries Inc., Grand Cayman (KY)

(72) Inventors: Young-Hye Na, San Jose, CA (US); Alshakim Nelson, Fremont, CA (US); Ratnam Sooriyakumaran, San Jose, CA (US); Ankit Vora, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 270 days.

(21) Appl. No.: 14/246,041

(22) Filed: Apr. 5, 2014

(65) Prior Publication Data

US 2014/0217014 A1     Aug. 7, 2014

Related U.S. Application Data

(62) Division of application No. 12/873,376, filed on Sep. 1, 2010, now Pat. No. 8,709,536.

(51) Int. Cl.
*B01D 39/00* (2006.01)
*B01D 39/14* (2006.01)
(Continued)

(52) U.S. Cl.
CPC ............. *B01D 71/56* (2013.01); *B01D 69/125* (2013.01); *B01D 71/40* (2013.01); *B01D 71/44* (2013.01); *B01D 71/68* (2013.01); *B01D 2325/48* (2013.01)

(58) Field of Classification Search
CPC .. B01D 2325/48; B01D 69/125; B01D 71/56; B01D 2323/30; B01D 2323/40; B01D 61/025; B01D 67/0006; B01D 69/12; B01D 71/68; B01D 2239/0421; B01D 2325/36; B01D 71/40; B05D 1/18; B05D 3/067
See application file for complete search history.

(56) References Cited

U.S. PATENT DOCUMENTS 4,554,317 A   11/1985   Behar et al.
4,897,091 A    1/1990   Pasternak et al.
(Continued)

FOREIGN PATENT DOCUMENTS

EP    0419396 A1   3/1991
WO    9962623      12/1999

OTHER PUBLICATIONS

Florian, et al., "Preparation and Characterization of Novel Solvent-Resistant Nanofiltration Composite Membranes Based on Crosslinked Polyurethanes," Ind. Eng. Chem. Res., 2007, 46(14), 4891-4899.
(Continued)

*Primary Examiner* — Ana Fortuna
(74) *Attorney, Agent, or Firm* — Michael J. LeStrange, Esq.

(57) ABSTRACT

A method comprises disposing, on a porous support membrane, an aqueous mixture comprising a crosslinkable polymer comprising a poly(meth)acrylate and/or poly(meth)acrylamide backbone, thereby forming an initial film layer, wherein the crosslinkable polymer comprises a side chain nucleophilic amine group capable of interfacially reacting with a multi-functional acid halide crosslinking agent to form a crosslinked polymer; contacting the initial film layer with a mixture comprising i) the multi-functional acid halide crosslinking agent, ii) an optional accelerator, and iii) an organic solvent, the organic solvent being a non-solvent for the crosslinkable polymer; and allowing the crosslinkable polymer to interfacially react with the crosslinking agent, thereby forming a composite filtration membrane comprising an anti-fouling selective layer comprising the crosslinked polymer.

23 Claims, 7 Drawing Sheets

(51) Int. Cl.
*B01D 29/00* (2006.01)
*B29C 65/00* (2006.01)
*B01D 71/56* (2006.01)
*B01D 69/12* (2006.01)
*B01D 71/40* (2006.01)
*B01D 71/68* (2006.01)
*B01D 71/44* (2006.01)

(56) References Cited

U.S. PATENT DOCUMENTS

| | | | |
|---|---|---|---|
| 4,914,064 A | 4/1990 | Schucker | |
| 4,931,483 A | 6/1990 | Matsuoka et al. | |
| 5,169,719 A | 12/1992 | Balatan | |
| 5,578,688 A | 11/1996 | Ito et al. | |
| 5,693,227 A | 12/1997 | Costa | |
| 6,280,853 B1 | 8/2001 | Mickols | |
| 6,346,588 B1 | 2/2002 | Fenchl et al. | |
| 6,632,915 B1 | 10/2003 | Schwarte et al. | |
| 7,585,927 B2 | 9/2009 | Liu | |
| 7,631,768 B2* | 12/2009 | Duong | B01D 67/0093 210/490 |
| 7,677,398 B2 | 3/2010 | Belfer et al. | |
| 7,815,987 B2 | 10/2010 | Mickols et al. | |
| 7,868,087 B2 | 1/2011 | Mayes et al. | |
| 8,011,517 B2 | 9/2011 | Allen et al. | |
| 8,224,746 B1* | 7/2012 | Rolf | G06Q 20/04 705/38 |
| 8,313,651 B2 | 11/2012 | Childs et al. | |
| 8,550,256 B1* | 10/2013 | Diep | B01D 65/08 210/490 |
| 8,709,536 B2* | 4/2014 | Na | B01D 69/125 210/490 |
| 8,727,135 B2* | 5/2014 | Cheng | B01D 71/40 210/490 |
| 9,022,227 B2* | 5/2015 | Na | B01D 69/12 210/500.38 |
| 2003/0121857 A1 | 7/2003 | Kurth et al. | |
| 2003/0124357 A1 | 7/2003 | Kagerer et al. | |
| 2007/0251883 A1 | 11/2007 | Niu | |
| 2008/0071056 A1 | 3/2008 | Borst | |
| 2008/0149561 A1 | 6/2008 | Chu et al. | |
| 2008/0181861 A1 | 7/2008 | Jiang et al. | |
| 2009/0156460 A1 | 6/2009 | Jiang et al. | |
| 2009/0159527 A1 | 6/2009 | Mickols et al. | |
| 2009/0162662 A1 | 6/2009 | Chang et al. | |
| 2009/0197791 A1 | 8/2009 | Balastre et al. | |
| 2009/0266764 A1 | 10/2009 | Kawakatsu | |
| 2010/0093874 A1 | 4/2010 | Monin et al. | |
| 2012/0241373 A1* | 9/2012 | Na | B01D 69/12 210/500.38 |
| 2012/0288912 A1 | 11/2012 | McCarthy et al. | |
| 2013/0178125 A1* | 7/2013 | Jiang | C09D 5/165 442/1 |
| 2014/0209534 A1* | 7/2014 | Liu | B01D 39/2017 210/502.1 |
| 2015/0191693 A1* | 7/2015 | Ameringer | C08J 7/18 435/396 |
| 2015/0320913 A1* | 11/2015 | Song | A61L 27/34 525/276 |

OTHER PUBLICATIONS

Nunes, et al., "Dense hydrophilic composite membranes for ultrafiltration", Journal of Membrane Science 106 (1995) 49-56.
Qiu, et al., "Preparation of Reverse Osmosis Composite Membrane with High Flux by Interfacial Polymerization of MPD and TMC," Journal of Applied Polymer Science, vol. 112, 2066-2072 (2009).
Sagle, et al., "PEG-coated reverse osmosis membranes: Desalination properties and fouling resistance", Journal of Membrane Science, 340, (2009), 92-108.
Sforca, et al., "Composite nanofiltration membranes prepared by in situ polycondensation of amines in a poly(ethylene oxide-b-amide) layer," Journal of Membrane Science 135 (1997) 179-186.
USPTO, non-final office action, U.S. Appl. No. 12/873,376, mailed Jun. 26, 2013.

* cited by examiner

COMPOSITE FILTRATION MEMBRANES AND METHODS OF PREPARATION THEREOF

CROSS REFERENCE TO RELATED APPLICATIONS

This application is a division of, and claims the benefit of, non-provisional U.S. patent application Ser. No. 12/873,376 entitled "COMPOSITE FILTRATION MEMBRANES AND METHODS OF PREPARATION THEREOF", filed on Sep. 1, 2010, now U.S. Pat. No. 8,709,536, herein incorporated by reference in its entirety.

BACKGROUND

The present invention relates to composite filtration membranes, methods of their preparation, and uses thereof, and more specifically, to anti-fouling membranes for ultrafiltration comprising a layer of interfacially crosslinked poly(meth)acrylates and/or poly(meth)acrylamides.

Membrane technologies such as microfiltration (MF), ultrafiltration (UF), nanofiltration (NF), and reverse osmosis (RO) are widely used for water purification because they are energy efficient, cost-effective and simple to operate. However, many commercial membranes experience substantial flux declines when they are exposed to a mixture of inorganic salt, emulsified oil droplets, and natural organic matters (dissolved organic compounds, various proteins, and other biomaterials). These contaminants in water cause membrane fouling (deposition on membrane surface and/or blocking membrane pores), shortening the lifetime of the membrane. Current approaches to address the fouling problem include pretreatment of the feed, periodic depressurization of the membrane tube, flow reversal, and use of cleaning agents to remove fouled films from the membrane surface. These techniques require additional energy and reduce the productive operating time of the membrane, thereby directly contributing to operating cost.

Various materials and methods have also been used to modify membrane surfaces in an effort to enhance fouling resistance. These include coating membrane surfaces with nanoparticles, enzymes, and epoxy compounds; coating membrane surfaces with poly(ethylene glycol) (PEG) based brush copolymers made by atom transfer radical polymerization (ATRP); forming a crosslinked coating based on cyclooctene monomers comprising PEO chains; growing sulfobetaine methacrylate (SBMA) copolymers by ATRP polymerization initiated on a membrane surface; covalently grafting poly(ethylene oxide) (PEO) derivatives comprising epoxy groups to a membrane surface; and employing interfacial polymerization of a difunctional aromatic amine monomer with a multifunctional acid chloride monomer to form a crosslinked polyamide network on a polysulfone UF support for reverse osmosis and nanofiltration membranes, but commercial RO and NF membranes made by interfacial polymerization do not yet provide fouling resistance. The monomers are coated in tandem layers and react without a drying step. Although the above-described materials and techniques are efficient in reducing membrane fouling, generally they are not well-suited for large scale manufacturing. The methods of preparing the modified membranes often require additional steps of casting, drying and curing to form thin selective layers on support membranes. For example, the ATRP based polymers are disadvantaged by the use of a copper catalyst, which is removed at the end of the reaction by passing the ATRP polymers through alumina columns multiple times. In another example, azide-functional cyclooctene monomers, used in making ultraviolet radiation crosslinkable polymers on UF support, are particularly hazardous for large scale industrial applications.

Consequently, a continuing need exists for filtration membranes, particularly for water purification, having enhanced fouling resistance, anti-microbial properties, and/or enhanced salt rejection properties.

SUMMARY

Accordingly, a method is disclosed, comprising:
disposing, on a porous support membrane, an aqueous mixture comprising a crosslinkable polymer comprising a poly(meth)acrylate and/or poly(meth)acrylamide backbone, thereby forming an initial film layer, wherein the crosslinkable polymer comprises a side chain nucleophilic amine group capable of interfacially reacting with a multi-functional acid halide crosslinking agent to form a crosslinked polymer;

contacting the initial film layer with a mixture comprising i) the multi-functional acid halide crosslinking agent, ii) an optional accelerator, and iii) an organic solvent, the organic solvent being a non-solvent for the crosslinkable polymer; and allowing the crosslinkable polymer to interfacially react with the crosslinking agent, thereby forming a composite filtration membrane comprising an anti-fouling selective layer comprising the crosslinked polymer.

Further disclosed is a composite filtration membrane, comprising:
a porous support membrane layer; and
an anti-fouling selective layer disposed on the porous support membrane layer; the selective layer comprising a crosslinked polymer of formula (15):

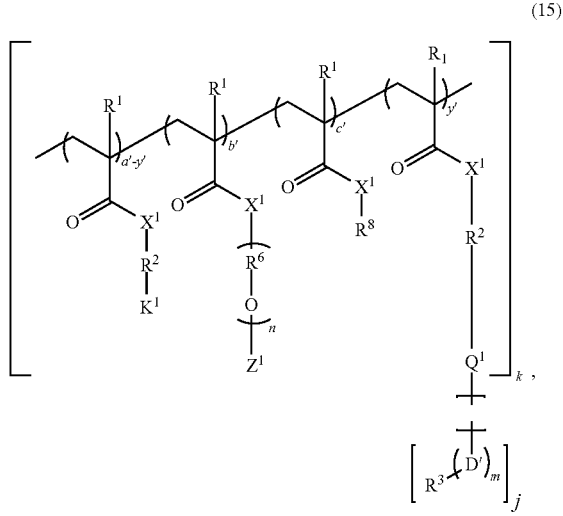

wherein
each —$R^1$ is independently a hydrogen or a methyl group,
—$R^2$— is a linear, branched or cyclic divalent radical selected from the group consisting of alkylenes, fluoroalkylenes, arylenes, arylalkylenes, alkylarylenes, and silicon containing groups,
$R^3$ is a bridging group having a valency of m and comprising 1 to 10,000 carbons,
—$X^1$— is a divalent radical selected from the group consisting of —O—, —N(H)—, and —N($R^5$)—,
—$R^5$ is a monovalent radical comprising 1 to 20 carbons, m is a positive integer greater than or equal to 2, j represents a number of bridging groups $R^3$ which are bound to one backbone of the crosslinked polymer, j being a number greater than or equal to 1, k represents a number of backbones of the crosslinked polymer which are bound to one bridging group $R^3$, k being a positive number greater than or equal to 2, a', b', c', and y' are positive numbers, n is a positive integer greater than 1, —$K^1$ is a monovalent radical selected from the group consisting of —$NH_2$— and —$N(H)(R^4)$—, —$R^4$ is a monovalent radical comprising 1 to 50 carbons, —$R^6$— is a divalent radical selected from the group consisting of a ethylene, 2-propylene, butylene, and combinations thereof, —$Z^1$ is a monovalent radical selected from the group consisting of —H, —$R^7$, -$L^1$-$NH_2$, -$L^1$-$N(H)(R^7)$, -$L^1$-$N(R^7)_2$, and hydrogen salt forms of any of the foregoing amine groups, —$R^7$ is a monovalent hydrocarbon radical comprising 1 to 20 carbons, -$L^1$- is a divalent radical comprising 1 to 20 carbons, —$R^8$ is a cationic monovalent radical comprising a member selected from the group consisting of quaternary amine salts, sulfonium salts, phosphonium salts, and combination thereof, wherein —$R^8$ has a net positive charge, -D'-$Q^1$- is a divalent linking group selected from the group consisting of amides, sulfonamides, sulfinamides, and functional groups having a phosphorous-nitrogen bond, -$Q^1$- is a divalent radical independently selected from the group consisting of —N(H)— and —$N(R^4)$—, —$R^4$ is a monovalent radical comprising 1 to 50 carbons, and -D'- is a divalent radical independently selected from the group consisting of —C(=O)—, —$S(=O)_2$—, and —S(=O)—, and groups comprising a phosphorous bonded to a nitrogen of -$Q^1$-.

Also disclosed is a composite filtration membrane, comprising:

a porous support membrane layer; and an anti-fouling selective layer disposed on the porous support membrane layer; the selective layer comprising a crosslinked polymer of formula (16):

(16)

wherein each —$R^1$ is independently a hydrogen or a methyl group,

—$R^2$— is a linear, branched or cyclic divalent radical selected from the group consisting of alkylenes, fluoroalkylenes, arylenes, arylalkylenes, alkylarylenes, and silicon containing groups, $R^3$ is a bridging group having a valency of m and comprising 1 to 10,000 carbons, —$X^1$— is a divalent radical selected from the group consisting of —O—, —N(H)—, and —$N(R^5)$—, —$R^5$ is a monovalent radical comprising 1 to 20 carbons, m is a positive integer greater than or equal to 2, j represents a number of bridging groups $R^3$ which are bound to one backbone of the crosslinked polymer, j being a number greater than or equal to 1, k represents a number of backbones of the crosslinked polymer which are bound to one bridging group $R^3$, k being a positive number greater than or equal to 2, d', e', f', and y' are positive numbers, n is a positive integer greater than 1, —$K^1$ is a monovalent radical selected from the group consisting of —$NH_2$— and —$NH(R^4)$—, —$R^4$ is a monovalent radical comprising 1 to 50 carbons, —$R^6$— is a divalent radical selected from the group consisting of a ethylene, 2-propylene, butylene, and combinations thereof, —$Z^1$ is a monovalent radical selected from the group consisting of —H, —$R^7$, -$L^1$-$NH_2$, -$L^1$-$NHR^7$, -$L^1$-$N(R^7)_2$, and hydrogen salt forms of any of the foregoing amine groups, —$R^7$ is a monovalent radical comprising 1 to 20 carbons, -$L^1$- is a divalent radical comprising 1 to 20 carbons, —$R^9$ is a zwitterionic monovalent radical comprising i) a cationic group selected from the group consisting of quaternary amines, sulfonium groups, phosphonium groups, and combinations thereof, and ii) an anionic group selected from the group consisting of carboxylate (—$CO_2^-$), sulphonate (—$SO_3^-$), and sulfinate (—$SO_2^-$), wherein —$R^9$— has a net zero charge, -D'-$Q^1$- is a divalent linking group selected from the group consisting of amides, sulfonamides, sulfinamides, and functional groups having a phosphorous-nitrogen bond, -$Q^1$- is a divalent radical selected from the group consisting of —N(H)— and —$N(R^4)$—, —$R^4$ is a monovalent radical comprising 1 to 50 carbons, and -D'- is a divalent radical selected from the group consisting of —C(=O)—, —$S(=O)_2$—, and —S(=O)—, and groups comprising a phosphorous bonded to a nitrogen of -$Q^1$-.

The above-described and other features and advantages of the present invention will be appreciated and understood by those skilled in the art from the following detailed description, drawings, and appended claims.

BRIEF DESCRIPTION OF THE SEVERAL VIEWS OF THE DRAWINGS

In the drawings, like parts are numbered alike.

Figure 5:
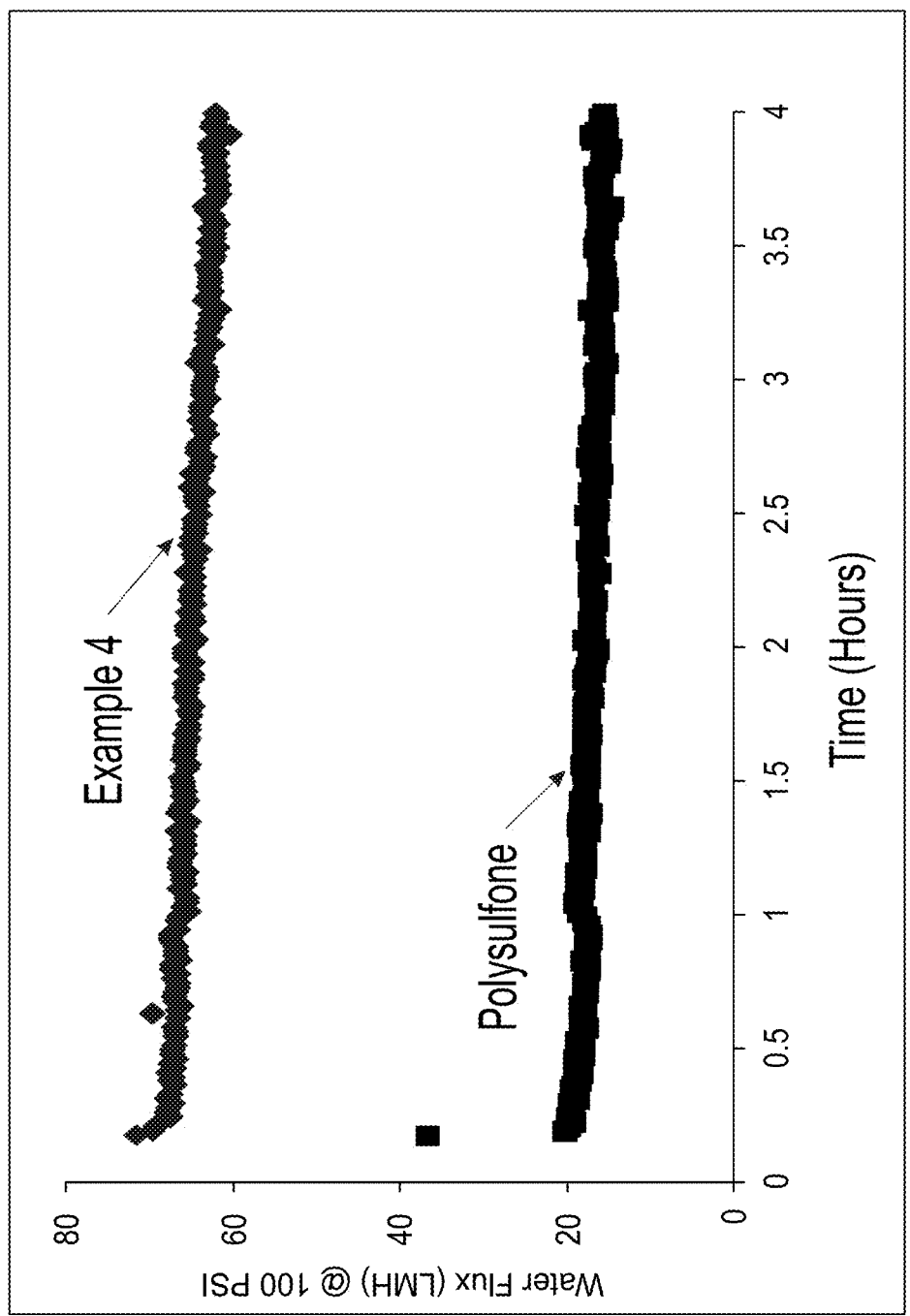

FIG. 5 is a graph comparing permeate flux with time of the composite membrane prepared in Example 4 (top curve) with an untreated polysulfone ultrafiltration membrane (bottom curve), using an oil/water emulsion in a cross-flow filtration test, at a constant pressure of 100 psi. The permeate flux of the composite membrane, which has a selective layer of crosslinked sulfobetaine copolymer (Example 1), is consistently higher than the control polysulfone membrane over a 4 hour period.

Figure 6:
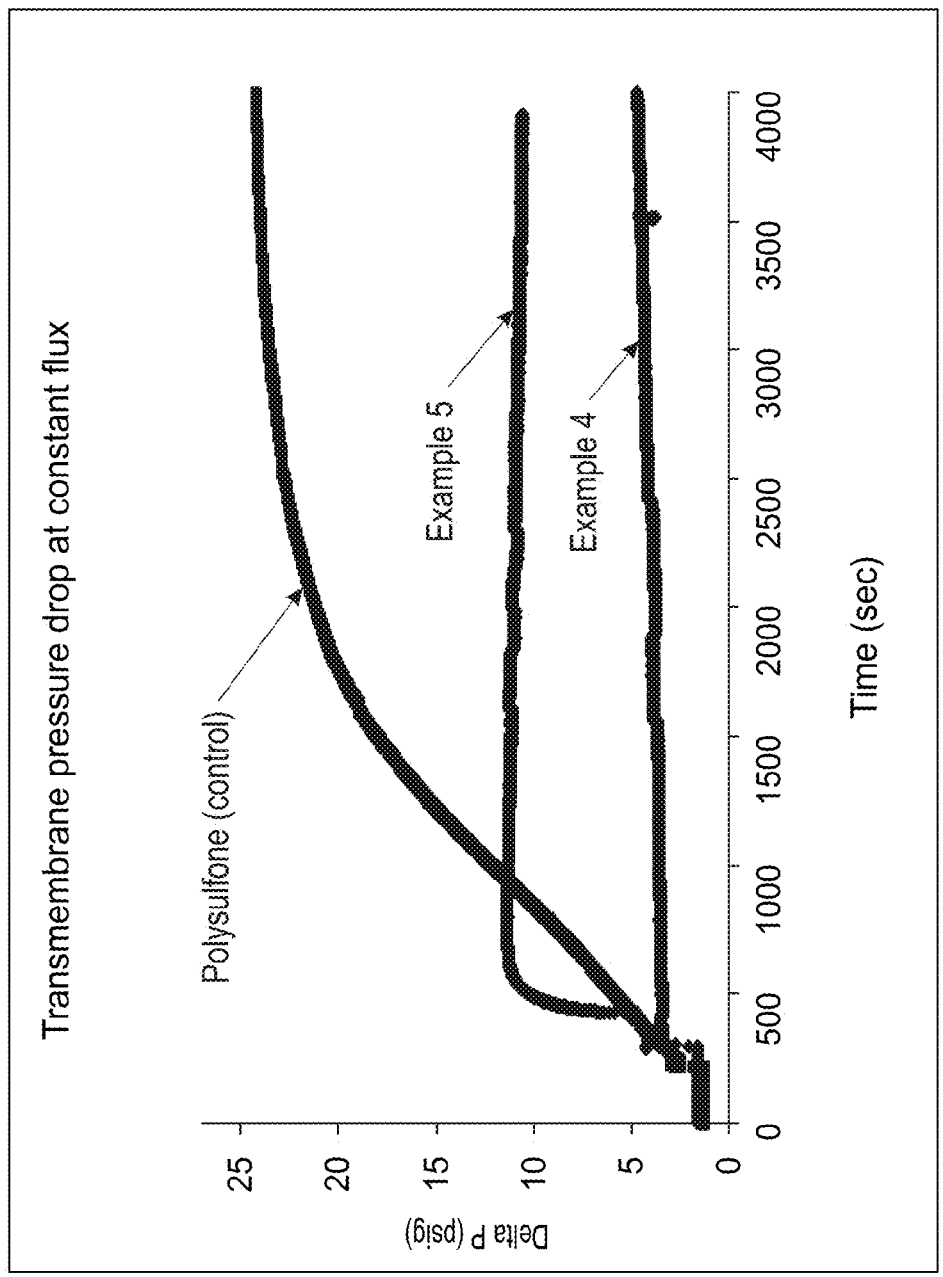

FIG. 6 is a graph showing the pressure differential across several membranes as a function of time at constant flux using a cross-flow filtration setup. The top curve corresponds to untreated polysulfone ultrafiltration membrane. The middle curve corresponds to the composite membrane of Example 5. The bottom curve, showing the least pressure drop, corresponds to composite membrane of Example 4.

Figure 7:
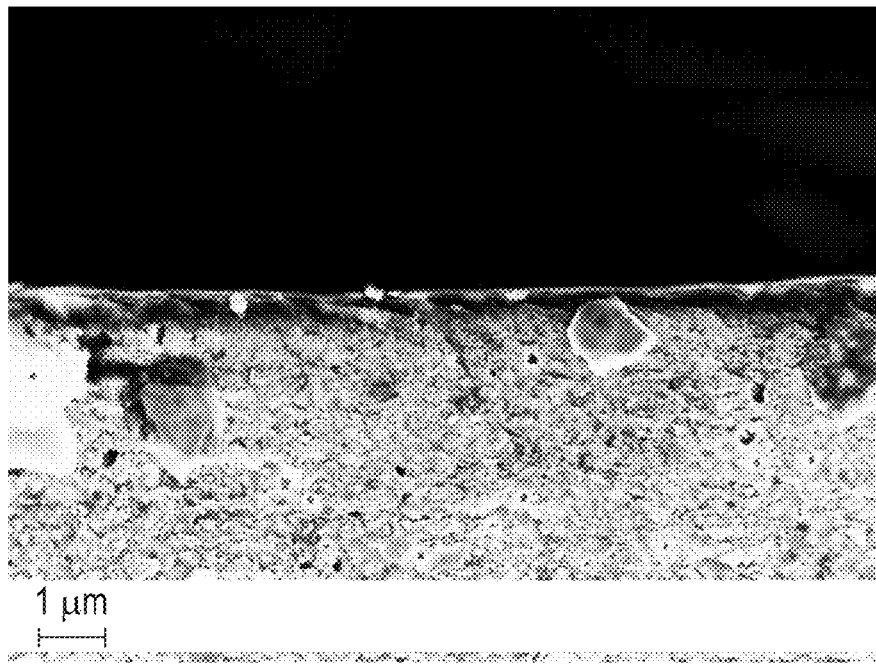

FIG. 7 is a cross-sectional scanning electron micrograph (SEM) image of the composite membrane of Comparative Example 2. The pores of the PSF support membrane are clogged.

Figure 8:
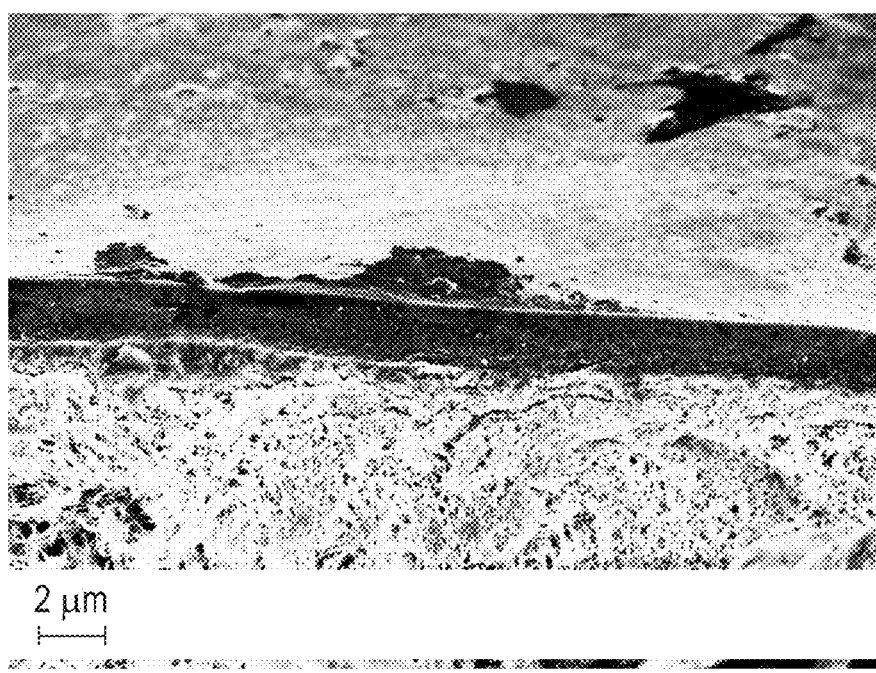

FIG. 8 is a cross-sectional SEM image of the composite membrane of Comparative Example 3, and shows a thick coating of the crosslinked polymer layer.

Figure 9:
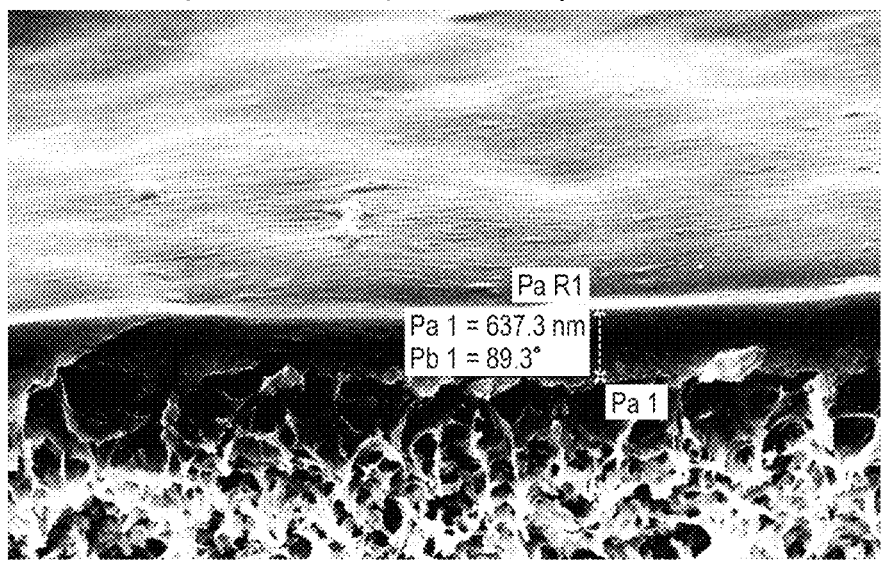

FIG. 9 is a cross-sectional SEM of the composite membrane of Comparative Example 4. The thickness of the crosslinked polymer layer is about 637 nm.

Figure 10:
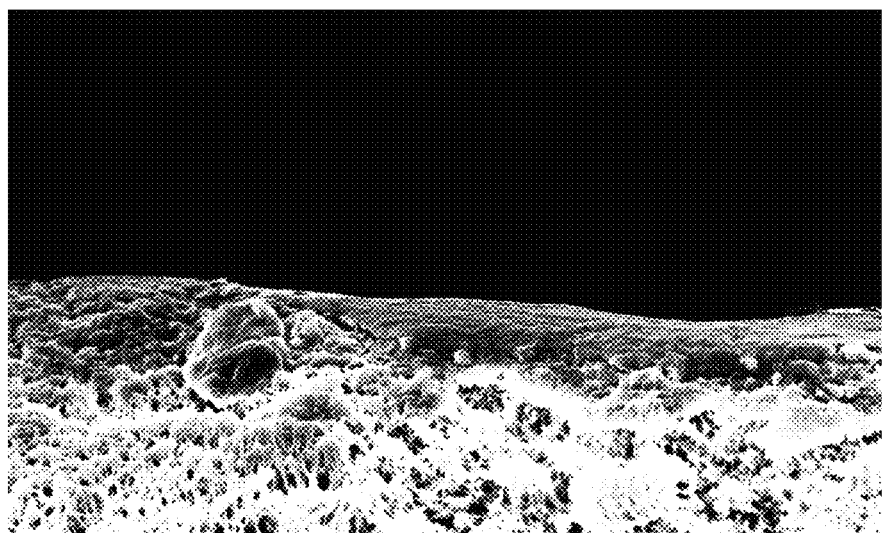

FIG. 10 is a cross-sectional SEM of the composite membrane of Comparative Example 6. The thickness of the crosslinked polymer layer is about 1 micrometer. The pores of the PSF support membrane are clogged.

Figure 11:
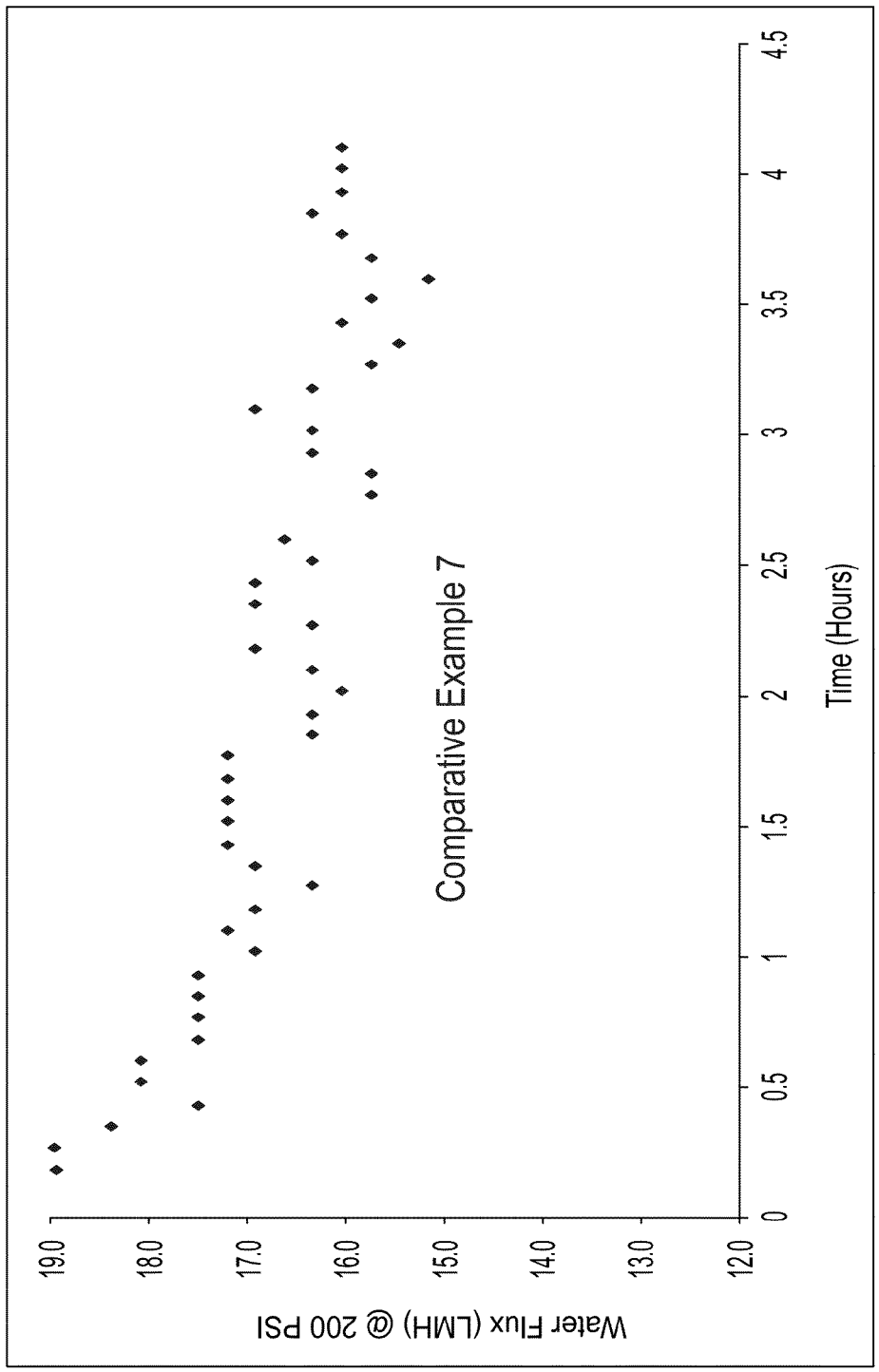

FIG. 11 is a graph showing the permeate flux with time of the composite membrane formed by interfacially reacting 1,3-phenylenediamine with trimesoyl chloride in Comparative Example 7 at a constant pressure of 200 psi.

DETAILED DESCRIPTION

Disclosed are composite membranes for fluid filtration that comprise an ultrathin layer of interfacially crosslinked poly (meth)acrylate and/or poly(meth)acrylamide disposed on a porous support membrane. The ultrathin layer is referred to as a selective layer of the composite membrane because of its anti-fouling and anti-microbial properties. The interfacial crosslink reaction is conducted by contacting an initial film layer of a crosslinkable poly(meth)acrylate and/or poly (meth)acrylamide with a mixture comprising a multi-functional acid halide crosslinking agent, an optional accelerator, and an organic solvent, which is a non-solvent for the crosslinkable polymer. The crosslinkable polymer comprises a side chain nucleophilic amine group, which is capable of an interfacial reaction with the acid halide crosslinking agent. A thin, crosslinked poly(meth)acrylate and/or poly(meth)acrylamide is produced interfacially in about 10 minutes. The anti-fouling and anti-microbial composite membranes have industrial applicability especially in the filtration of aqueous mixtures, which includes microfiltration, ultrafiltration, nanofiltration, and/or reverse osmosis of aqueous mixtures. More particularly, the selective membranes are suitable as anti-fouling layers for ultrafiltration membranes.

Figure 1:
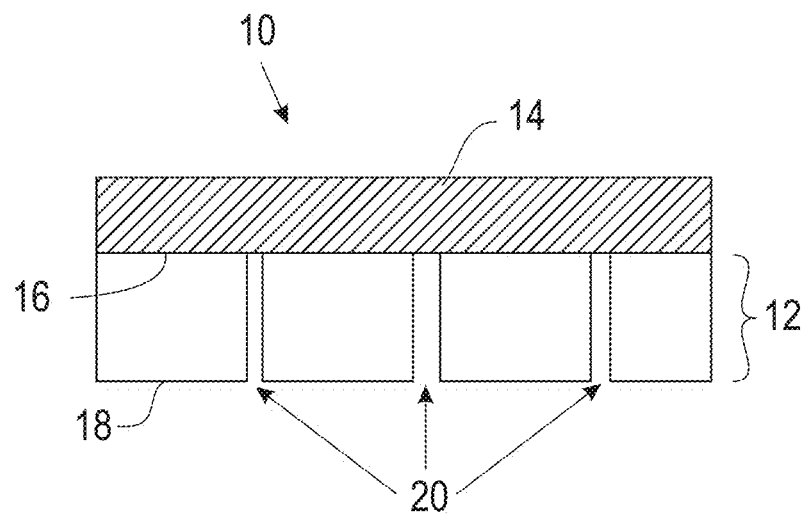
FIG. 1 is a cross-sectional layer diagram of a composite filtration membrane having a selective layer disposed on a porous support membrane.
Figure 2:
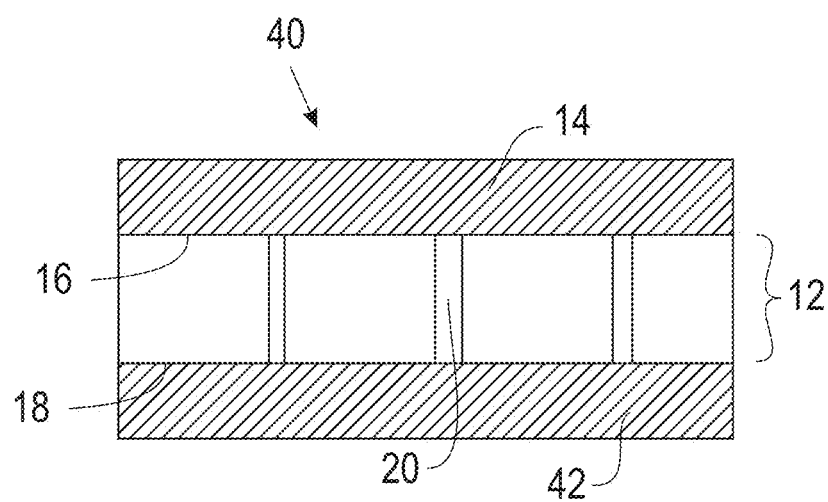
FIG. 2 is a cross-sectional layer diagram of a composite filtration membrane having two selective layers disposed on different faces of a porous support membrane.

Two embodiments of composite membranes are depicted in the cross-sectional layer diagrams of FIGS. 1 to 2.

In FIG. 1, composite filtration membrane 10 comprises porous support membrane 12 having top surface 16, bottom surface 18, pores 20, and selective layer 14 disposed on top surface 16 comprising a crosslinked poly(meth)acrylate. Porous support membrane 12 can comprise one or more additional layers. Selective layer 14 can be bonded to porous support membrane 12 covalently or by non-covalent interactions. Alternatively, selective layer 14 can have minimal or no adhering contact with porous support membrane 12, meaning little or no force is required to physically separate the two layers. As shown in FIG. 1, selective layer 14 does not substantially occupy pores 20.

In another embodiment, illustrated in the cross-sectional layer diagram of FIG. 2, composite filtration membrane 40 comprises a first selective layer 14 in contact with top surface 16 of porous support membrane 12, and a second selective layer 44 in contact with bottom surface 18 of porous support membrane 12. First selective layer 14 and second selective layer 44 do not substantially occupy pores 20.

As used herein, a "fluid" can be a liquid or a gas.

The term "(meth)acrylate" indicates an acrylate or a methacrylate monomer. The term "(meth)acrylamide" refers to an acrylamide or a methacrylamide monomer. The term "poly (meth)acrylate" refers to a polymer in which the majority of the repeat units are derived from one or more acrylate monomers, one or more methacrylate monomers, or combinations thereof. The term "poly(acrylate)" refers to a polymer in which the majority of the repeat units are derived from one or more acrylate monomers. The term "poly(methacrylate)" refers to a polymer wherein the majority of the repeat units are derived from one or more methacrylate monomers. The term "poly(meth)acrylamide" refers to a polymer wherein the majority of the repeat units are derived from one or more acrylamide monomers, one or more methacrylamide monomers, or combinations thereof.

For brevity, the term "crosslinkable polymer and/or crosslinkable poly(meth)acrylamide" is referred to as "crosslinkable polymer," and the term "crosslinked poly (meth)acrylate and/or crosslinked poly(meth)acrylamide" is referred to as "crosslinked polymer."

The term "acid halide" includes carboxylic acid halides, sulfonyl halides, sulfinyl halides, and functional groups comprising one or more phosphorous-halide bonds that can react with an amine to form a phosphorous-nitrogen bond. Linking groups formed by the reaction of a primary or secondary alkyl or aryl amine with any of the above acid halides include carboxy amides (i.e., —C(=O)N(R')(R")—), sulfonamides (i.e., —S(=O)$_2$N(R)(R")—), sulfinamides (i.e., —S(=O)N (R')(R")—), and functional groups comprising a phosphorous-nitrogen bond, where —R' or —R" can be a monovalent hydrogen or a carbon bearing substituent. Herein, carboxy amides are also referred to simply as amides.

The term "water-compatible" herein means soluble in water or suitably dispersible in water for the method used in forming the initial film layer of crosslinkable polymer. The crosslinkable polymer is water-compatible and can be applied to a porous support membrane or a temporary support from an aqueous mixture, thereby forming an initial film layer. The crosslinkable polymer is substantially in-soluble in the solvent used to dissolve the acid halide crosslinking agent.

A cationic side chain is a side chain having a net positive charge based on charged groups covalently bound to the side chain. The net positive charge does not include negative counterions which are not covalently bound to the side chain, such as a halide counterion to a quaternary amine group. As an example, a poly(meth)acrylate repeat unit derived from the monomer diethyl aminoethyl methacrylate methyl iodide salt has a cationic side chain comprising a quaternary amine group.

A zwitterionic side chain is a dipolar side chain comprising a cationic group and an anionic group. The zwitterionic side chain has a net zero charge based on the charged groups that are covalently bound to the side chain. The net zero charge does not include negative or positive counterions which are not covalently bound to the side chain. As an example, a poly(meth)acrylate repeat unit derived from the monomer sulfobetaine methacrylate has a zwitterionic side chain comprising a quaternary amine group and a sulfonate ($SO_3^-$) group.

Herein, the crosslinked polymer comprises two or more polymer backbones covalently linked to one or more bridging repeat units. By "polymer backbones" is meant poly(meth)acrylates and/or poly(meth)acrylamide backbones. The bridging repeat unit comprises a bridging group derived from the core structure of the multi-functional acid halide crosslinking agent. The bridging group is connected by independent linking groups to independent side chain moieties of two or more independent polymer backbones. Each linking group comprises a nitrogen heteroatom residue of a nucleophilic amine group of the crosslinkable polymer. The linking groups are formed in the interfacial crosslink reaction, by the reaction of a side chain nucleophilic amine group of the crosslinkable polymer with an acid halide group of the crosslinking agent. The bridging repeat unit of the crosslinked polymer is represented by the general formula (1):

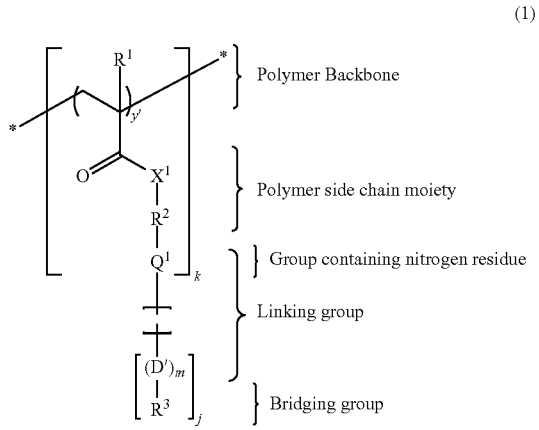

wherein

—$R^1$ is independently a hydrogen or a methyl group,

—$R^2$— is a linear, branched or cyclic divalent radical independently selected from the group consisting of alkylenes, fluoroalkylenes, arylenes, arylalkylenes, alkylarylenes, and silicon containing groups, $R^3$ is a bridging group having a valency of m and comprising 1 to 10,000 carbons, —$X^1$— is a divalent radical independently selected from the group consisting of —O—, —N(H)—, and —N($R^5$)—, —$R^5$ is a monovalent radical comprising 1 to 20 carbons, m is an positive integer greater than or equal to 2, j represents a number of bridging groups $R^3$ bound to one backbone of the crosslinked polymer, j being a number greater than or equal to 1, k represents a number of backbones of the crosslinked polymer bound to one bridging group $R^3$, k being a positive number greater than or equal to 2, y' is a positive number greater than or equal to 1, -D'-$Q^1$- is a divalent linking group selected from the group consisting of amide, sulfonamide, sulfinamide, functional groups having a phosphorous-nitrogen bond, and combinations thereof, -$Q^1$- is a divalent radical selected from the group consisting of —N(H)— and —N($R^4$)—, —$R^4$ is a monovalent radical comprising 1 to 50 carbons, and -D'- is a divalent radical selected from the group consisting of —C(=O)—, —S(=O)$_2$—, and —S(=O)—, and groups comprising a phosphorous bonded to a nitrogen of -$Q^1$-.

In an embodiment, -D'- is a —C(=O)— or a —S(=O)$_2$— group.

It should be understood that because the valency of $R^3$ can range from 2 to m, the valency cannot be represented by hyphens as in the monovalent and divalent radicals described above.

The crosslinked polymer further comprises one or more repeat units selected from the group consisting of i) repeat units comprising a poly(alkylene oxide) side chain segment, ii) repeat units comprising a side chain comprising a cationic group, the side chain having a net positive charge, iii) repeat units comprising a side chain comprising a zwitterionic group, the side chain having a net zero charge, and iv) repeat units comprising a an amide side chain, wherein a linear homopolymer of the repeat unit exhibits thermoreversible properties in water, and v) combinations of the foregoing repeat units. The linking groups of the crosslinked polymer comprise a nitrogen residue of the nucleophilic amine group of the crosslinkable polymer. In an embodiment, —$X^1$— of formula (1) is —O—, and -D'-$Q^1$- is an amide group.

It should be understood that the starred bonds in formula (1) and in other structures that follow indicate a point of attachment of an adjacent repeat unit or moiety, not a methyl or methylene group.

The crosslinkable polymer can be a random copolymer or a block copolymer. The block copolymer can comprise a block comprising a homopolymer chain segment or a random copolymer chain segment. The number average molecular weight $M_n$ of the crosslinkable polymer can be 1000 to 1,000,000 g/mol, more particularly 1000 to 100,000 g/mol, and even more particularly 1000 to 50,000 g/mole.

The water-compatible crosslinkable polymer comprises i) a first repeat unit comprising a side chain nucleophilic amine group capable of reaction with a multi-functional acid halide crosslinking agent to form a crosslinked polymer, and ii) one or more repeat units comprising a side chain group selected from the group consisting of a) hydrophilic poly(alkylene oxide) side chain groups, b) cationic side chain groups, which have a net positive charge, c) zwitterionic side chain groups, which have a net zero charge, d) amide side chain groups, wherein the crosslinkable polymer has thermoreversible properties in water, and e) combinations of the foregoing side chain groups.

The crosslinkable polymer can further optionally comprise one or more repeat units derived from a non-crosslinking hydrophobic vinyl monomer. Further, the term "quaternary amine" includes non-cyclic quaternary nitrogens (e.g., tetralkyl ammonium salts) and cyclic quaternary nitrogens (e.g., quaternized pyridine group, quaternized imidazole group, quaternized piperidine group, and the like).

Several particular embodiments of the crosslinkable polymer composition follow.

In one embodiment, the crosslinkable polymer comprises i) a first repeat unit comprising an ester side chain moiety comprising a nucleophilic amine group capable of reacting with a multi-functional acid halide crosslinking agent, ii) a second repeat unit comprising an ester side chain moiety comprising a poly(alkylene oxide) chain, and iii) a repeat unit comprising an ester side chain moiety comprising a zwitterionic group, wherein the zwitterionic group has a net zero charge.

In a second embodiment, the crosslinkable polymer comprises i) a first repeat unit comprising an ester side chain moiety comprising a nucleophilic amine group capable of reacting with a multi-functional acid halide crosslinking agent, ii) a second repeat unit comprising an ester side chain moiety comprising a poly(alkylene oxide) chain, and iii) a repeat unit comprising an ester side chain moiety comprising a cationic group selected from the group consisting of quaternary amines, sulfonium groups, phosphonium groups, and combinations thereof, wherein the cationic group has a net positive charge.

In a third embodiment, the crosslinkable polymer comprises i) a first repeat unit comprising an ester side chain moiety comprising a nucleophilic amine group capable of reacting with a multi-functional acid halide crosslinking agent, and ii) a second repeat unit comprising an amide side chain moiety, wherein the crosslinkable polymer has a lower critical solution temperature (LCST) or upper critical solution temperature transition (UCST) in water at a temperature of 0° C. to 100° C., at a pH of 5 to 7, and at a concentration of more than 0 wt. % and less than or equal to 20 wt. % based on total weight of the solution. A crosslinkable polymer possessing an LCST or UCST in water is referred to herein as a thermoreversible crosslinkable polymer. The LCST or UCST can vary depending on the structure of the crosslinkable polymer. As a non-limiting example, an aqueous mixture of a thermoreversible crosslinkable polymer can have the form a gel at a temperature below 20° C., which reversibly collapses to a low viscosity dispersion at a temperature above 20° C. In another non-limiting example, a thermoreversible crosslinkable polymer can have a bell-shaped viscosity curve that peaks in viscosity at a temperature of, for example, 50° C., that collapses to a low viscosity dispersion or solution at either lower or higher temperatures. The LCST or UCST transition (e.g., the temperature range at which a rapid reversible change in viscosity is observed) can occur at any temperature in the 0° C. to 100° C. temperature range. The second repeat unit has an amide side chain moiety in which the amide nitrogen comprises one or more hydrocarbon substituents selected from the group consisting of methyl, ethyl, n-propyl, iso-propyl, cyclopropyl, n-butyl, sec-butyl, t-butyl, and combinations thereof.

In any of the above embodiments, the crosslinkable polymer is water-miscible, and more particularly water soluble, forming a clear solution in water at the concentration used to deposit the crosslinkable polymer on a porous support membrane.

The nucleophilic amine groups of the crosslinkable polymer can be primary amines, secondary amines, a mixture thereof, or a hydrogen salt form of any of the foregoing amines.

The poly(alkylene oxide) side chain group can also comprise a nucleophilic amine group capable of undergoing an interfacial crosslink reaction with the multi-functional acid halide crosslinking agent.

The first repeat units of the crosslinkable polymer, which comprise the side chain nucleophilic amine group, have the general formula (2),

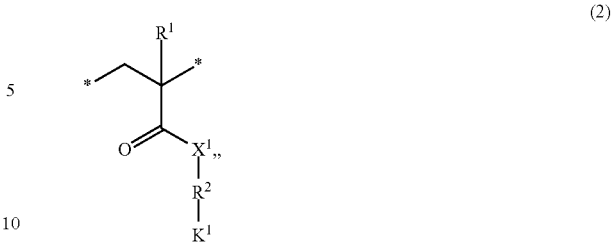

wherein
—$R^1$ is a hydrogen or a methyl group,
—$R^2$— is a linear, branched or cyclic divalent radical selected from the group consisting of alkylenes, fluoroalkylenes, arylenes, arylalkylenes, alkylarylenes, and silicon containing groups,
—$X^1$— is a divalent radical selected from the group consisting of —O—, —N(H)—, and —N($R^5$)—,
—$R^5$ is a monovalent radical comprising 1 to 20 carbons,
—$K^1$ is a monovalent radical selected from the group consisting of —$NH_2$ and —N(H)($R^4$), wherein —$K^1$ is capable of undergoing an interfacial reaction with a multi-functional acid halide crosslinking agent and
—$R^4$ is a monovalent radical comprising 1 to 50 carbons.

In an embodiment, —$X^1$— is —O—, and the first repeat unit is derived from a (meth)acrylate monomer of general formula (3):

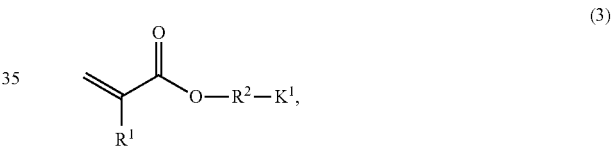

wherein —$R^1$, —$R^2$—, and —$K^1$ are defined as above.

Exemplary (meth)acrylate monomers of general formula (3) include 2-aminoethyl methacrylate (AEMA), 3-amino-1-propyl(meth)acrylate, 5-amino-1-pentyl(meth)acrylate, 6-amino-1-hexyl(meth)acrylate, 11-amino-1-undecyl(meth) acrylate, hydrogen salt forms of any of the foregoing second (meth)acrylate monomers, such as 2-aminoethyl methacrylate hydrochloride (AEMA-HCL), and combinations of the foregoing materials.

Repeat units of the crosslinkable polymer that comprise a hydrophilic poly(alkylene oxide) side chain are represented by the general formula (4):

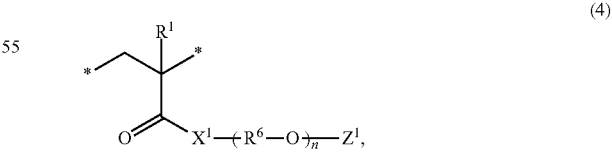

wherein
n is a positive integer greater than 1,
—$R^1$ is a hydrogen or a methyl group,
—$X^1$— is a divalent radical selected from the group consisting of —O—, —N(H)—, and —N($R^5$)—,
—$R^5$ is a monovalent hydrocarbon radical comprising 1 to 20 carbons, —$R^6$— is a divalent radical selected from the group consisting of a ethylene, 2-propylene, butylene, and combinations thereof, —$Z^1$ is a monovalent radical selected from the group consisting of —H, —$R^7$, -$L^1$-$NH_2$, -$L^1$-N(H)$R^7$, -$L^1$-N($R^7$)$_2$, and hydrogen salt forms of any of the foregoing amine groups, —$R^7$ is a monovalent hydrocarbon radical comprising 1 to 20 carbons, and -$L^1$- is a divalent radical comprising 1 to 20 carbons.

In an embodiment, each —$X^1$— is —O—, and repeat units comprising a hydrophilic poly(alkylene oxide) side chain group are derived from one or more (meth)acrylate monomers of general formula (5):

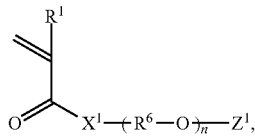

(5)

wherein
—$R^1$, —$R^6$—, n, and —$Z^1$ are defined as above. In an embodiment, —$Z^1$ is a methyl or ethyl group.

The poly(ethylene oxide) chain segment can be a poly(propylene oxide) chain segment, poly(butylene oxide) chain segment, or a combination thereof (e.g., a poly(ethylene oxide-co-propylene oxide) copolymer chain segment). The co-poly(alkylene oxide) chain segment can be a block copolymer or a random copolymer. As indicated above in the definition of —$Z^1$, the terminal end group of the poly(alkylene oxide) chain segment can comprise a nucleophilic amine group capable of an interfacial reaction with the multi-functional acid halide crosslinking agent. Alternatively, the end group of the poly(alkylene oxide) chain segment can be end capped so as to be non-reactive in the interfacial reaction. Non-limiting examples of poly(ethylene glycol) end capped methacrylate monomers include poly(ethylene glycol)methyl ether methacrylate (MPEGMA), poly(ethylene glycol) ethyl ether methacrylate (EPEGMA), and poly(propylene glycol)methyl ether methacrylate (PPGMA), Table 1.

TABLE 1

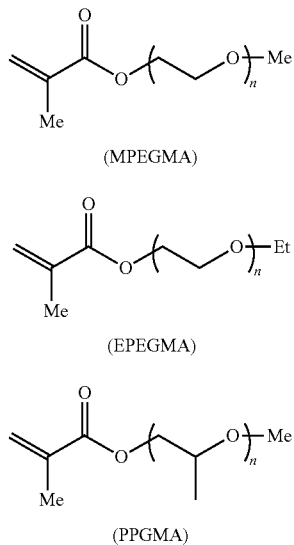

The poly(alkylene oxide) chain segment comprises at least two alkylene oxide repeat units, more particularly 3 to 100 alkylene oxide repeat units (i.e., n is a positive integer of 3 to 100 in formula (5)). In an embodiment, the poly(alkylene oxide) chain segment is a poly(ethylene oxide) chain segment (i.e., —$R^6$— is ethylene (—$CH_2CH_2$—)), and n is a positive integer of 5 to 15.

Cationic repeat units of the crosslinkable polymer and the crosslinked polymer comprise a cationic side chain group and have a net positive charge. Cationic repeat units have the general formula (6):

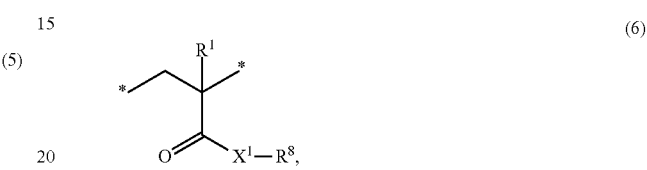

(6)

wherein
—$R^1$ is a hydrogen or a methyl group,
—$X^1$— is a divalent radical selected from the group consisting of —O—, —N(H)—, and —N($R^5$)—,
—$R^5$ is a monovalent hydrocarbon radical comprising 1 to 20 carbons, and
—$R^8$ is a monovalent radical comprising a cationic group selected from the group consisting of quaternary amines, sulfonium groups, phosphonium groups, and combinations thereof. In an embodiment, the cationic group comprises a non-cyclic quaternary amine group, and —$R^8$ has a net positive charge.

In an embodiment, —$X^1$— is —N(H)— or —N($R^5$)— and the cationic repeat unit is derived from a cationic (meth)acrylamide. Exemplary cationic (meth)acrylamides include methacrylamido ethyl trimethyl ammonium chloride and methacrylamido propyl trimethyl ammonium chloride.

In another embodiment, —$X^1$— is —O—, and the cationic repeat units are derived from one or more cationic (meth)acrylate monomers of general formula (7):

(7)

wherein —$R^1$ and —$R^8$ are defined as above.

Exemplary cationic (meth)acrylate monomers include but are not limited to acryloxy ethyl dimethylbenzyl ammonium chloride and acryloxy ethyl trimethyl ammonium chloride sold under the tradenames NORSOCRYL by Arkema Inc. of France, 2-methacryloyloxy ethyl trimethyl ammonium chloride sold under the tradename MADQUAT Q6 by Norsolac, Inc., Sedalia, Mo., and 2-methacryloyloxy propyl trimethyl ammonium chloride. An even more specific cationic (meth)acrylate monomer is diethyl aminoethyl methacrylate methyl iodide salt (DMEAMA-MI):

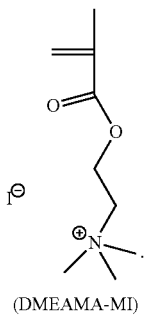

(DMEAMA-MI)

Zwitterionic repeat units of the crosslinkable polymer and the crosslinked polymer are dipolar side chain groups which have a net zero charge. Zwitterionic repeat units have the general formula (8):

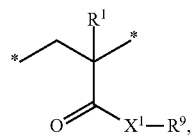 (8)

wherein

—$R^1$ is a hydrogen or a methyl group,

—$X^1$— is a divalent radical selected from the group consisting of —O—, —N(H)—, and —N($R^5$)—, —$R^5$ is a monovalent radical comprising 1 to 10 carbons, and —$R^9$ is a zwitterionic monovalent radical comprising i) a cationic group selected from the group consisting of quaternary amines, sulfonium groups, phosphonium groups, and combinations thereof, and ii) an anionic group selected from the group consisting of carboxylate (—$CO_2^-$), sulphonate (—$SO_3^-$), sulfinate (—$SO_2^-$), and combinations thereof, wherein —$R^9$ has a net zero charge.

In an embodiment, each —$X^1$— is —O—, and zwitterionic repeat units are derived from one or more (meth)acrylate monomers of general formula (9):

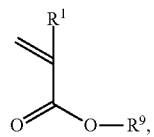 (9)

wherein $R^1$ and $R^9$ are defined as above.

Exemplary zwitterionic monomers include sulfobetaine methacrylate (SBMA) and carboxybetaine methacrylate (CBMA):

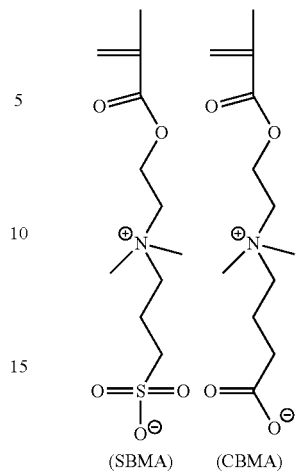

(SBMA)    (CBMA)

The crosslinkable polymer can optionally include repeat units derived from a hydrophobic vinyl polymerizable monomers in order to control the water-permeability and/or swell behavior of the selective layer. Non-limiting optional hydrophobic monomers include, for example, methyl methacrylate (MMA), methyl acrylate (MA), benzyl(meth)acrylate, cyclohexyl(meth)acrylate, 2-ethylhexyl(meth)acrylate, styrene, vinyl acetate, and combinations thereof.

Also contemplated are crosslinkable polymers generated from a (meth)acrylate or (meth)acrylamide monomer, which comprises two of the following functional groups: i) a nucleophilic amine group capable of reacting with a multi-functional acid halide crosslinking agent to form a crosslinkable polymer, ii) an ester or amide group comprising a poly(alkylene oxide) group, iii) an ester or amide group comprising a cationic group, and iv) an ester or amide group comprising a zwitterionic group. As one non-limiting example, the crosslinkable polymer can comprise a first repeat unit derived from a (meth)acrylate monomer, which comprises a side chain comprising i) a cationic group and ii) a nucleophilic amine group capable of interfacial reaction with the multi-functional crosslinking agent. The crosslinkable polymer can, for example, further comprise a second repeat unit derived from a (meth)acrylate monomer comprising a poly (alkylene oxide) chain segment. As another non-limiting example, the crosslinkable polymer can comprise repeat units derived from a (meth)acrylate monomer comprising a side chain poly(alkylene oxide) chain having a nucleophilic amine group capable of reacting with the multi-functional crosslinking agent.

The crosslinkable polymer can be prepared using various known methods and conditions for the polymerization of vinyl monomers, in particular (meth)acrylate monomers, including but not limited to solution polymerization, suspension polymerization, and emulsion polymerization. The monomers can be polymerized batch-wise to form a random copolymer, or sequentially to generate block copolymers. In particular, the crosslinkable polymer is formed by free radical polymerization, initiated by organic peroxides, azo compounds, persulfates, photoinitiators, and ionized radiation such as γ-rays. The polymerization is conducted at a temperature of 20° C. to 100° C., more particularly 40° C. to 90° C.

The crosslinkable polymer can comprise first repeat units comprising a nucleophilic amine group in an amount of about 5 wt. % to about 20 wt. % based on total weight of the monomers used to prepare the crosslinkable polymer. When present, repeat units comprising a poly(alkylene oxide) chain segment are present in an amount of about 30 wt. % to about 70 wt. % based on total weight of the monomers used to prepare the crosslinkable polymer. When present, repeat units comprising a cationic or zwitterionic group are present in an amount of about 55 wt. % to about 10 wt. % based on total weight of the monomers used to make the crosslinkable polymer. In a specific example, the crosslinkable polymer comprises a poly(methacrylate) copolymer of 2-aminoethyl methacrylate hydrochloride (AEMA-HCL) (corresponding to the first repeat units), poly(ethylene glycol)methyl ether methacrylate (MPEGMA), and sulfobetaine methacrylate (SBMA). The first repeat units derived from AEMA-HCL are present in an amount of about 5 wt. % to about 20 wt. %, repeat units derived from MPEGMA are present in an amount of about 30 wt. % to about 70 wt. %, and repeat units derived from SBMA are present in an amount of about 55 wt. % to about 10 wt. %, each based on total weight of monomers used to make the crosslinkable polymer. In an embodiment, the crosslinkable polymer comprises a polymethacrylate copolymer comprising first repeat units derived from AEMA-HCL in an amount of about 5 wt. % to about 15 wt. %, and second repeat units derived from MPEGMA in an amount of about 55 wt. % to about 70 wt. %, each based on the total weight of monomers used to make the crosslinkable polymer.

The crosslinkable polymer can comprise a repeat unit having a cationic side chain group, wherein the side chain has a net positive charge. These crosslinkable polymers have the general formula (10):

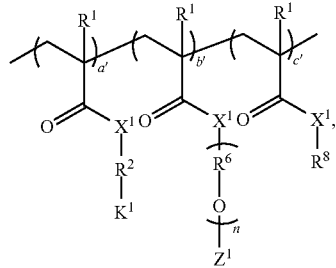

(10)

wherein
a', b' and c' are positive numbers,
n is a positive integer greater than 1,
each —$R^1$ is independently a hydrogen or a methyl group,
—$R^2$— is a linear, branched or cyclic divalent radical selected from the group consisting of alkylenes, fluoroalkylenes, arylenes, arylalkylenes, alkylarylenes, and silicon containing groups,
—$X^1$— is a divalent radical selected from the group consisting of —O—, —N(H)—, and —N($R^5$)—,
—$R^5$ is a monovalent radical comprising 1 to 20 carbons,
—$K^1$ is a monovalent radical selected from the group consisting of —$NH_2$— and —N(H)($R^4$)—,
—$R^4$ is a monovalent radical comprising 1 to 50 carbons,
—$R^6$— is a divalent radical selected from the group consisting of a ethylene, 2-propylene, butylene, and combinations thereof,
—$Z^1$ is a monovalent radical selected from the group consisting of —H, —$R^7$, -$L^1$-$NH_2$, -$L^1$-N(H)($R^7$), -$L^1$-N($R^7$)$_2$, and hydrogen salt forms of any of the foregoing amine groups,
—$R^7$ is a monovalent radical comprising 1 to 20 carbons,
-$L^1$- is a divalent radical comprising 1 to 20 carbons, and
—$R^8$ is a cationic monovalent radical comprising a member selected from the group consisting of quaternary amine salts, sulfonium salts, phosphonium salts, or combination thereof, wherein —$R^8$— has a net positive charge.

In an embodiment, —$X^1$— is —O—, —$R^6$— is ethylene, and —$R^8$ comprises a quaternary amine group, wherein —$R^8$ has a net positive charge.

In formula (10) the first repeat unit indicated by a' can be present in an amount of about 5 wt. % to about 20 wt. %, the second repeat unit indicated by b' can be present in an amount of about 40 wt. % to about 70 wt. %, and the third repeat unit indicated by c' can be present in an amount of about 55 wt. % to about 10 wt. %, each based on total weight of the crosslinkable polymer.

The crosslinkable polymer can comprise a repeat unit having a zwitterionic side chain group. These crosslinkable polymers have the general formula (11):

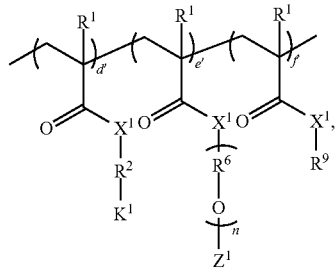

(11)

wherein
d', e' and f' are positive numbers,
n is a positive integer greater than 1,
each —$R^1$ is independently a hydrogen or a methyl group,
—$R^2$— is a linear, branched or cyclic divalent radical selected from the group consisting of alkylenes, fluoroalkylenes, arylenes, arylalkylenes, alkylarylenes, and silicon containing groups,
—$X^1$— is a divalent radical selected from the group consisting of —O—, —N(H) and —N($R^5$)—,
—$R^5$ is a monovalent radical comprising 1 to 20 carbons,
—$K^1$ is a monovalent radical selected from the group consisting of —$NH_2$— and —N(H)($R^4$)—,
—$R^4$ is a monovalent radical comprising 1 to 50 carbons,
—$R^6$— is a divalent radical selected from the group consisting of a ethylene, 2-propylene, butylene, and combinations thereof,
—$Z^1$ is a monovalent radical selected from the group consisting of —H, —$R^7$, -$L^1$-$NH_2$, -$L^1$-N(H)($R^7$), -$L^1$-N($R^7$)$_2$, and hydrogen salt forms of any of the foregoing amine groups,
—$R^7$ is a monovalent radical comprising 1 to 20 carbons,
-$L^1$- is a divalent radical comprising 1 to 20 carbons, and
—$R^9$ is a zwitterionic monovalent radical comprising i) a cationic group selected from the group consisting of quaternary amines, sulfonium groups, phosphonium groups, and combinations thereof, and ii) an anionic group selected from the group consisting of carboxylate (—$CO_2^-$), sulphonate (—$SO_3^-$), sulfinate (—$SO_2^-$), and combinations thereof, wherein —$R^9$— has a net zero charge.

In an embodiment, —$X^1$— is —O—, —$R^6$— is ethylene, and —$R^9$— comprises a quaternary amine group and a sulfonate (—$SO_3^-$) group, and —$R^9$— has a net zero charge.

In formula (11) the first repeat unit indicated by d' can be present in an amount of about 5 wt. % to about 20 wt. %, the second repeat unit indicated by e' can be present in an amount of about 40 wt. % to about 70 wt. %, and the third repeat unit indicated by f' can be present in an amount of about 55 wt. % to about 10 wt. %, each based on total weight of the crosslinkable polymer.

In an embodiment, the multi-functional acid halide crosslinking agent is selected from the group consisting of

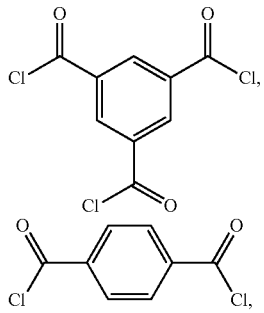

and combinations thereof.

The thermoreversible crosslinkable polymer has the general formula (12):

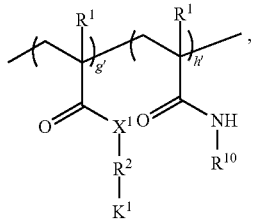

wherein
g' and h' are positive numbers,
each —$R^1$ is independently a hydrogen or a methyl group,
—$R^2$— is a linear, branched or cyclic divalent radical selected from the group consisting of alkylenes, fluoroalkylenes, arylenes, arylalkylenes, alkylarylenes, and silicon containing groups,
—$X^1$— is a divalent radical selected from the group consisting of —O—, —N(H)—, and —N($R^5$)—,
—$R^5$ is a monovalent radical comprising 1 to 20 carbons,
—$K^1$ is a monovalent radical selected from the group consisting of —$NH_2$— and —N(H)($R^4$)—,
—$R^4$ is a monovalent radical comprising 1 to 50 carbons,
—$R^6$— is a divalent radical selected from the group consisting of a ethylene, 2-propylene, butylene, and combinations thereof,
—$R^{10}$ is a monovalent hydrocarbon radical selected from the group consisting of methyl, ethyl, n-propyl, iso-propyl, cyclopropyl, n-butyl, sec-butyl, t-butyl, and combinations thereof.

In an embodiment, —$X^1$— is —O—, and —$R^{10}$ is iso-propyl.

In formula (12) the first repeat unit indicated by g' can be present in an amount of about 5 wt. % to about 20 wt. %, and the second repeat unit indicated by h' can be present in an amount of about 80 wt. % to about 90 wt. %, each based on total weight of the crosslinkable polymer.

More specifically, the crosslinkable polymer is a random copolymer comprising repeat units comprising side chain nucleophilic amine groups capable of reacting interfacially with a multi-functional carboxylic acid halide crosslinking agent to form a crosslinked polymer. In a specific embodiment, the crosslinkable polymer is a random copolymer comprising repeat units derived from poly(ethylene glycol)methyl ether methacrylate, sulfobetaine methacrylate, and 2-aminoethyl methacrylate hydrochloride. In another specific embodiment, the crosslinkable polymer is a random copolymer comprising repeat units derived from poly(ethylene glycol)methyl ether methacrylate, 2-(N,N-dimethylamino)ethyl methacrylate methyl iodide, and 2-aminoethyl methacrylate hydrochloride. In another specific embodiment, the crosslinkable polymer is a random copolymer comprising repeat units derived from isopropyl acrylamide and 2-aminoethyl methacrylate hydrochloride.

The crosslinkable polymer can optionally comprise, in addition to the above described repeat units, repeat units derived from one or more additional polymerizable monomers. In these instances, the crosslinkable polymer can comprise more than 0 wt. % and less than about 10 wt. % of the additional repeat units based on total weight of the crosslinkable polymer. In an embodiment, the additional repeat units preferably account for no more than 10 wt. %, more preferably no more than 5 wt. %, and most preferably no more than 2 wt. % of the total weight of the crosslinkable polymer.

The multi-functional crosslinking agent comprises a core structure which becomes the bridging group $R^3$ of formula (1). The crosslinking agent also comprises two or more independent acid halide groups linked to $R^3$, which are capable of interfacially reacting with the side chain nucleophilic amine groups to form a covalent bond. The multi-functional crosslinking agent has the general formula (13):

$$R^3\text{--}(E')_m, \tag{13}$$

wherein
m is an integer greater than or equal to 2,
-E' is a monovalent radical comprising an acid halide group, and
$R^3$ represents a core structure of the crosslinking agent, having a valency of m and comprising from 1 to 10,000 carbons. In an embodiment, E' comprises a carboxylic acid chloride. The crosslinking agent can be a monomeric or a polymeric material.

More specifically, the multi-functional acid halide crosslinking agent has the formula (14):

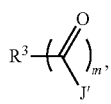

wherein
m is an integer greater than or equal to 2,
J' is a monovalent halogen selected from the group consisting of chloride, bromide, and iodide, and
$R^3$ represents a core structure having a valency m and comprising from 1 to 10,000 carbons. In an embodiment, J' is chloride. In another embodiment, m is three or more, J' is chloride, and the crosslink reaction produces amide linking groups (i.e., —RC(=O)N(H)R'— and/or —RC(=O)N(R')(R'')—.

The interfacial crosslink reaction can be conducted using a combination of multi-functional acid halide crosslinking agents.

The crosslinking agent is a material that dissolves in a non-polar organic solvent, more particularly a hydrocarbon solvent that is a non-solvent for the crosslinkable polymer. Non-limiting examples of hydrocarbon solvents include hexanes, ligroin, toluene, xylene, benzene, and the like.

Each acid halide group -E' of the crosslinking agent reacts independently with a side chain nucleophilic amine group, —$K^1$ (and optionally also —$Z^1$) of the crosslinkable polymer to form a linking group. The linking groups comprise a nitrogen heteroatom residue of the nucleophilic amine group. Thus, each linking group in the crosslinked polymer directly links a polymer side chain moiety to a bridging group. A polymer side chain that does not participate in the crosslink reaction becomes indirectly linked to a bridging group only through the polymer backbone.

The crosslinked polymer formed by the interfacial reaction of the crosslinking agent with the crosslinkable polymer of general formula (10), which has cationic repeat units, has the general formula (15):

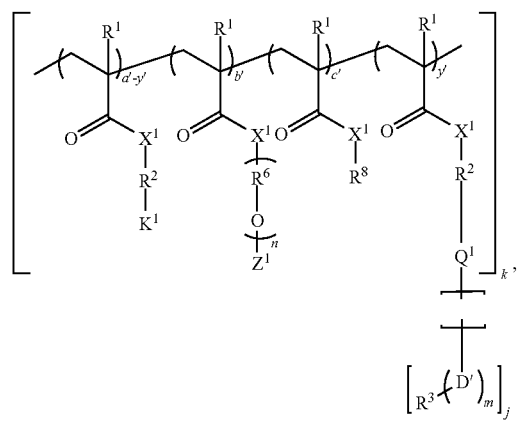

(15)

wherein
each —$R^1$ is independently a hydrogen or a methyl group,
—$R^2$— is a linear, branched or cyclic divalent radical selected from the group consisting of alkylenes, fluoroalkylenes, arylenes, arylalkylenes, alkylarylenes, and silicon containing groups,
$R^3$ is a bridging group having a valency of m and comprising 1 to 10,000 carbons,
—$X^1$— is a divalent radical selected from the group consisting of —O—, —N(H)—, and —N($R^5$)—,
—$R^5$ is a monovalent radical comprising 1 to 20 carbons,
m is a positive integer greater than or equal to 2,
j represents a number of bridging groups $R^3$ which are bound to one backbone of the crosslinked polymer, j being a number greater than or equal to 1,
k represents a number of backbones of the crosslinked polymer which are bound to one bridging group $R^3$, k being a positive number greater than or equal to 2,
a', b', c', and y' are positive numbers,
n is a positive integer greater than 1,
—$K^1$ is a monovalent radical selected from the group consisting of —$NH_2$— and —N(H)($R^4$)—,
—$R^4$ is a monovalent radical comprising 1 to 50 carbons, —$R^6$— is a divalent radical selected from the group consisting of a ethylene, 2-propylene, butylene, and combinations thereof,
—$Z^1$ is a monovalent radical selected from the group consisting of —H, —$R^7$, -$L^1$-$NH_2$, -$L^1$-N(H)($R^7$), -$L^1$-N($R^7$)$_2$, and hydrogen salt forms of any of the foregoing amine groups,
—$R^7$ is a monovalent hydrocarbon radical comprising 1 to 20 carbons,
-$L^1$- is a divalent radical comprising 1 to 20 carbons,
—$R^8$ is a cationic monovalent radical comprising a member selected from the group consisting of quaternary amine salts, sulfonium salts, phosphonium salts, and combination thereof, wherein —$R^8$ has a net positive charge,
-D'-$Q^1$- is a divalent linking group selected from the group consisting of amides, sulfonamides, sulfinamides, and functional groups having a phosphorous-nitrogen bond,
-$Q^1$- is a divalent radical independently selected from the group consisting of —N(H)— and —N($R^4$)—,
—$R^4$ is a monovalent radical comprising 1 to 50 carbons, and
-D'- is a divalent radical independently selected from the group consisting of —C(=O)—, —S(=O)$_2$—, and —S(=O)—, and groups comprising a phosphorous bonded to a nitrogen of -$Q^1$-.

In an embodiment, a'-y'=0, —$X^1$— is —O—, -D'-$Q^1$- is —C(=O)—N(H)—, —$R^6$— is ethylene (—$CH_2CH_2$—), and —$R^8$ comprises a quaternary amine group, wherein —$R^8$— has a net positive charge.

The interfacial reaction of the acid halide crosslinking agent and the crosslinkable polymer of general formula (11), which has zwitterionic repeat units, produces a crosslinked polymer having the general formula (16):

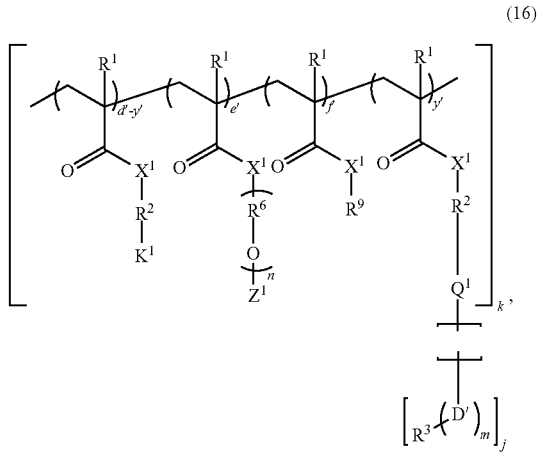

(16)

wherein
each —$R^1$ is independently a hydrogen or a methyl group,
—$R^2$— is a linear, branched or cyclic divalent radical selected from the group consisting of alkylenes, fluoroalkylenes, arylenes, arylalkylenes, alkylarylenes, and silicon containing groups,
$R^3$ is a bridging group having a valency of m and comprising 1 to 10,000 carbons,
—$X^1$— is a divalent radical selected from the group consisting of —O—, —N(H)—, and —N($R^5$)—,
—$R^5$ is a monovalent radical comprising 1 to 20 carbons,
m is a positive integer greater than or equal to 2,
j represents a number of bridging groups $R^3$ which are bound to one backbone of the crosslinked polymer, j being a number greater than or equal to 1, k represents a number of backbones of the crosslinked polymer which are bound to one bridging group $R^3$, k being a positive number greater than or equal to 2, d', e', f', and y' are positive numbers, n is a positive integer greater than 1, —$K^1$ is a monovalent radical selected from the group consisting of —$NH_2$— and —$NH(R^4)$—, —$R^4$ is a monovalent radical comprising 1 to 50 carbons, —$R^6$— is a divalent radical selected from the group consisting of a ethylene, 2-propylene, butylene, and combinations thereof, —$Z^1$ is a monovalent radical selected from the group consisting of —H, —$R^7$, -$L^1$-$NH_2$, -$L^1$-$NHR^7$, -$L^1$-$N(R^7)_2$, and hydrogen salt forms of any of the foregoing amine groups, —$R^7$ is a monovalent radical comprising 1 to 20 carbons, -$L^1$- is a divalent radical comprising 1 to 20 carbons, —$R^9$ is a zwitterionic monovalent radical comprising i) a cationic group selected from the group consisting of quaternary amines, sulfonium groups, phosphonium groups, and combinations thereof, and ii) an anionic group selected from the group consisting of carboxylate (—$CO_2^-$), sulphonate (—$SO_3^-$), and sulfinate (—$SO_2^-$), wherein —$R^9$— has a net zero charge, -D'-$Q^1$- is a divalent linking group selected from the group consisting of amides, sulfonamides, sulfinamides, and functional groups having a phosphorous-nitrogen bond, -$Q^1$- is a divalent radical selected from the group consisting of —N(H)— and —$N(R^4)$—, —$R^4$ is a monovalent radical comprising 1 to 50 carbons, and -D'- is a divalent radical selected from the group consisting of —C(=O)—, —S(=O)$_2$—, and —S(=O)—, and groups comprising a phosphorous bonded to a nitrogen of -$Q^1$-.

More particularly, n in formula (15) and formula (16) can be 5 to 15, even more particularly n can be 9 to 11. That is, the hydrophilic poly(alkylene oxide) side chain segment can have a degree of polymerization of 5 to 15 and, more particularly 9 to 11.

In an embodiment, —$X^1$— is —O—, —$R^6$— is ethylene, -D'-$Q^1$- is —C(=O)—N(H)—, and —$R^9$ comprises i) a cationic group comprising a quaternary amine group, and ii) an anionic group comprising a sulfonate group (—$SO_3^-$), wherein —$R^9$— has a net zero charge. In another embodiment, the side chain group represented by —C(=O)—$X^1$—$R^9$ is selected from the group consisting of

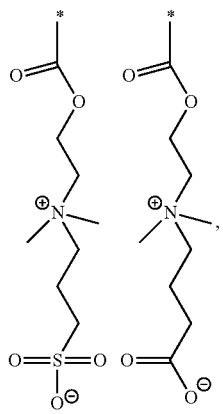

and combinations thereof.

The interfacial reaction of the crosslinking agent with the crosslinkable polymer of general formula (12), which has thermoreversible properties, produces a crosslinked polymer of general formula (17):

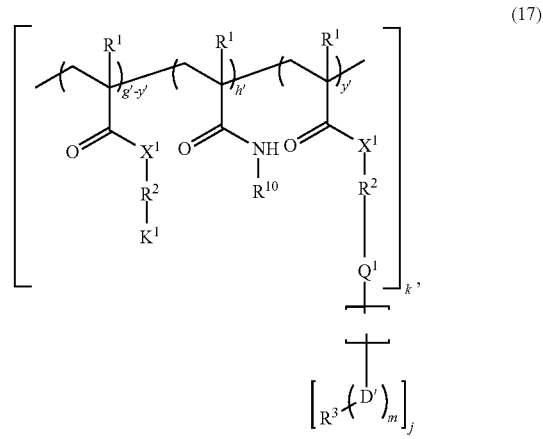

(17)

wherein each —$R^1$ is independently a hydrogen or a methyl group,

—$R^2$— is a linear, branched or cyclic divalent radical selected from the group consisting of alkylenes, fluoroalkylenes, arylenes, arylalkylenes, alkylarylenes, and silicon containing groups, $R^3$ is a bridging group having a valency of m and comprising 1 to 10,000 carbons, —$X^1$— is a divalent radical selected from the group consisting of —O—, —N(H)—, and —$N(R^5)$—, —$R^5$ is a monovalent radical comprising 1 to 20 carbons, m is a positive integer greater than or equal to 2, —$K^1$ is a monovalent radical selected from the group consisting of —$NH_2$— and —$N(H)(R^4)$—, —$R^4$ is a monovalent radical comprising 1 to 50 carbons, —$R^{10}$ is a monovalent hydrocarbon radical independently selected from the group consisting of methyl, ethyl, n-propyl, iso-propyl, cyclopropyl, n-butyl, sec-butyl, t-butyl, and combinations thereof, j represents a number of bridging groups $R^3$ which are bound to one polymer backbone of the crosslinked polymer, j being a positive number greater than or equal to 1, k represents a number of backbones of the crosslinked polymer which are bound to one bridging group $R^3$, k being a positive number greater than or equal to 2, g', h', and y' are positive numbers, -D'-$Q^1$- is a divalent linking group selected from the group consisting of amides, sulfonamides, sulfinamides, and functional groups having a phosphorous-nitrogen bond, -$Q^1$- is a divalent radical selected from the group consisting of —N(H)— and —$N(R^4)$—, —$R^4$ is a monovalent radical comprising 1 to 50 carbons, and -D'- is a divalent radical selected from the group consisting of —C(=O)—, —S(=O)$_2$—, and —S(=O)—, and groups comprising a phosphorous bonded to -$Q^1$-.

In an embodiment, —$X^1$— is —O—, -D'-$Q^1$- is —C(=O)—N(H)—, and —$R^{10}$ is iso-propyl.

A single bridging group $R^3$ can be directly linked to multiple side chain moieties of a single polymer backbone, by way of linking groups -D'-$Q^1$- in formulas (15), (16) and/or (17) formed by the interfacial crosslink reaction. In an embodiment, the linking groups -D'-$Q^1$- are amide groups. In another embodiment, m is 3 or more. In another embodiment, each -D'-Q¹- is —C(=O)—N(H)—, and R³ is a member of the group consisting of

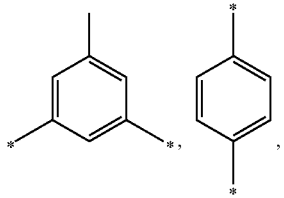

and
combinations thereof, wherein the starred bond indicates the point of attachment to D'.

More specifically, the crosslinked polymer is a material derived by interfacial reaction of i) a crosslinkable polymer comprising repeat units comprising side chain nucleophilic primary or secondary amine groups, and ii) a multi-functional carboxylic acid halide crosslinking agent; wherein the crosslinkable polymer is selected from the group consisting of
  i) a random copolymer comprising repeat units derived from poly(ethylene glycol)methyl ether methacrylate (MPEGMA), sulfobetaine methacrylate (SBMA), and 2-aminoethyl methacrylate hydrochloride (AEMA-HCL),
  ii) a random copolymer comprising repeat units derived from poly(ethylene glycol)methyl ether methacrylate (MPEGMA), 2-dimethylaminoethyl methacrylate methyl iodide (DMAEMA-MI), and 2-aminoethyl methacrylate hydrochloride (AEMA-HCL),
  iii) a random copolymer comprising repeat units derived from N-isopropyl acrylamide (NIPAM) and 2-aminoethyl methacrylate hydrochloride (AEMA-HCL), and
  iv) combinations thereof.

The interfacial reaction is performed at a pH of 7.0 or higher

The selective layer can be prepared as a self-supporting film. In this method, an aqueous solution of the crosslinkable polymer is disposed on a temporary support, thereby forming an initial film layer. The crosslinkable polymer comprises a nucleophilic amine group capable of reacting with a multi-functional acid halide crosslinking agent to form a crosslinked polymer. The initial film layer is contacted with a mixture comprising i) a multi-functional acid halide crosslinking agent comprising two or more acid halide groups, ii) an optional accelerator, and iii) a non-solvent for the crosslinkable polymer, thereby forming a self-supporting selective layer comprising the crosslinked polymer. The self-supporting selective layer is then separated from the temporary support. In an embodiment, the method further comprises layering the self-supporting selective layer with a porous support membrane, thereby forming an anti-fouling composite membrane for fluid purification. The non-solvent can be a hydrocarbon, such as hexanes. The crosslinkable polymer can comprise any of the above described structures of formula (10), formula (11), or formula (12), or combinations thereof. The crosslinked poly(meth)acrylate comprises the bridging repeat unit of formula (1), wherein linking groups -D'-Q¹-, formed by the reaction of the nucleophilic amine groups with the acid halide groups, are selected from the group consisting of amides, sulfonamides, sulfinamides, functional groups comprising a phosphorous-nitrogen bond, and combinations thereof. A single bridging group can be linked to any combination of these linking groups. In an embodiment, the linking groups are amides, and the acid halide groups of the crosslinking agent are carboxylic halide groups. In another embodiment, the anti-fouling composite membrane is suitable for aqueous ultrafiltration.

A preferred method of preparing an anti-fouling composite filtration membrane comprises i) disposing on a porous support membrane an aqueous solution comprising a crosslinkable polymer, thereby forming an initial film layer, the crosslinkable polymer comprising a nucleophilic amine group capable of interfacially reacting with a multi-functional acid halide crosslinking agent to form a crosslinked polymer, ii) contacting the initial film layer with a solution comprising the multi-functional acid halide crosslinking agent and an optional accelerator dissolved in an organic non-solvent for the crosslinkable polymer, and iii) allowing the crosslinkable polymer to interfacially react with the crosslinking agent, thereby forming a composite filtration membrane comprising an anti-fouling selective layer comprising the crosslinked polymer. The selective layer has a thickness greater than 0 nm and less than 50 nm. The crosslinkable polymer comprises a first repeat unit comprising a side chain nucleophilic amine group capable of reacting with the acid halide crosslinking agent, and one or more repeat units selected from the group consisting of i) repeat units, each comprising a poly(alkylene oxide) side chain segment, ii) repeat units, each comprising a side chain comprising a cationic group, the side chain having a net positive charge, iii) repeat units, each comprising a side chain comprising a zwitterionic group, the side chain having a net zero charge, iv) repeat units, each having an amide side chain which imparts lower critical solution temperature properties in water to the crosslinkable polymer, and v) combinations thereof, and wherein the crosslinked polymer comprises a bridging repeat unit comprising linking groups -D'-Q¹- selected from the group consisting of amides, sulfonamides, sulfinamides, functional groups comprising a phosphorous nitrogen bonds, and combinations thereof, the linking groups comprising a nitrogen of the nucleophilic amine group. The crosslinkable polymer can have a structure selected from the group consisting of formula (10), formula (11), formula (12), and combinations thereof, wherein —X¹— is —O—. The crosslinked polymer can have a structure selected from the group consisting of formula (15), formula (16), formula (17), and combinations thereof, wherein —X¹— is —O—. In another embodiment, the bridging group has a structure according to formula (1), wherein —X¹— is —O—. In another embodiment, the first repeat unit comprises a 2-aminoethyl ester group, derived from 2-aminoethyl methacrylate hydrochloride.

The coating mixture comprising the crosslinkable polymer can include other additives, such as a surfactant and/or thickener for producing a uniform coating. The coating mixture can include additional additives to enhance physical and/or mechanical properties, including, for example, fillers, reinforcing agents, antistatic agents, and the like, such additional additives being readily determined by those of skill in the art without undue experimentation. Examples of fillers or reinforcing agents include glass fibers, clays, carbon fibers, silica, and talc. Examples of antistatic agents include glycerol monostearate, sodium stearyl sulfonate, and sodium dodecylbenzenesulfonate. Individual, as well as combinations of the foregoing additives may be used. Such additives may be mixed at a suitable time during the mixing of the components for forming the composition.

The accelerator can be selected from known catalysts suitable for promoting the interfacial crosslink reaction, including, for example, tertiary amine bases.

The porous support membrane can be flexible or rigid, and can comprise a organic material, inorganic material, a metal material, or a combination of the foregoing materials. Exemplary organic materials for porous support membranes include cellulose acetates, cellulose nitrates, regenerated celluloses, polysulfones, polyethersulfones, polypiperazine amides (such as FILMTEC sold by Dow Chemical), polyacrylonitriles and copolymers, track-etched polyesters (e.g., those sold under the trade name CYCLOPORE by Whatman Ltd), polycarbonates (e.g., those sold under the trade name NUCLEPORE by Whatman Ltd, poly(vinylidene difluoride), polypropylenes, Nylon 6,6, poly(tetrafluoroethylene)s (e.g., those sold under the trade names PORO-TEX and PARA-TEL by DeWAL Industries), and combinations of the foregoing materials. Exemplary inorganic materials for porous support membranes include nanoporous alumina ($Al_2O_3$) (e.g., those sold under the trade name ANOPORE by Whatman Ltd), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials. Exemplary metals for porous support membranes include for example nickel, nickel alloys, and stainless steel.

The porous support membrane has an average pore diameter of about 1 to about 1000 nm, about 1 to 100 nm (0.1 micrometer), about 1 to 10 nm, about 2 to about 8 nm, and even more particularly about 3 to about 6 nm. It is understood that the term "pores" refers to regular and irregular voids and/or channels extending from one face to an opposite face of the porous support membrane. Microfiltration (MF) support membranes have an average pore size of about 0.1 micrometers and a molecular weight cutoff of about 500,000 Daltons. Ultrafiltration (UF) support membranes have an average pore size of about 0.01 micrometers to about 0.1 micrometers and a molecular weight cutoff of about 1,000 Daltons to 500,000 Daltons. Nanofiltratoin (NF) support membranes have an average pore size of about 0.001 micrometers to about 0.01 micrometers and a molecular weight cutoff of about 100 Daltons to about 1000 Daltons. Reverse Osmosis (RO) support membranes have an average pore size of about 0.001 micrometers or less and a molecular weight cutoff of less than about 100 Daltons. The pore size of poly(sulfone) (PSF) ultrafiltration support membrane used in the examples below is about 0.01 micrometers (10 nm).

The porous support membrane can have a thickness of 1 micrometer to 10 millimeters, more particularly 1 micrometer to 100 micrometers, more particularly 1 micrometer to 80 micrometers, and even more particularly 1 micrometer to 50 micrometers.

In an embodiment, the crosslinkable polymer has no repeat unit comprising a side chain alcohol group or a side chain thiol group capable of an interfacial reaction with the acid halide crosslinking agent. The interfacial crosslink reaction involves the reaction of side chain amine groups with the acid halide groups of the crosslinking agent. More specifically, the side chain amine groups are preferably primary amine groups.

In a specific embodiment, the crosslinkable polymer is derived from sulfobetaine methacrylate (SBMA), 2-aminoethyl methacrylate hydrochloride (AEMA-HCL), and poly(ethylene glycol)methyl ether methacrylate (MPEGMA), the support membrane is a polysulfone membrane for ultrafiltration, and the acid halide crosslinking agent is isophthaloyl chloride. In another specific embodiment, the crosslinkable polymer is derived from 2-dimethylaminoethyl methacrylate methyl iodide (DMAEMA-MI), 2-aminoethyl methacrylate hydrochloride (AEMA-HCL), and poly(ethylene glycol)methyl ether methacrylate (MPEGMA), the support membrane is a polysulfone membrane, and the acid halide crosslinking agent is isophthaloyl chloride. In another embodiment, the monomer mole ratio in each of the above crosslinkable polymers is respectively 3.7:1.0:5.3.

Although poly(ethylene oxide) graft copolymers, also known as poly(ethylene glycol) (PEG) graft copolymers, have been previously used for nanofiltration membranes, they are not crosslinked and hence adhesion to the support membrane is an issue when used for longer timescales. The disclosed method of forming an initial film layer by coating a crosslinkable polymer from water, and interfacially polymerizing the crosslinkable polymer, allows the formation of an ultrathin anti-fouling selective layer that is less prone to plugging the support membrane than methods which rely on the interfacial polymerization of monomers to form polyamides. The disclosed selective layers can be used in applications where high performance properties are required, such as chemical resistance and good adhesion to the substrate. The amine functional copolymers can be easily synthesized using free radical polymerization, and can be crosslinked with commercially available bis-acid halides or poly-acid halides. The disclosed methods also allow for a wide range of performance properties by adjusting the structure and/or content of the monomers used to form the crosslinkable polymer, adjusting the structure of the multi-functional acid halide crosslinking agent, or by adjusting the swelling behavior of the membranes by changing the amine to acid halide ratios in the formulations. In this way, membrane properties such as water flux and salt rejection can be balanced for a particular commercial application.

Further disclosed are the ultrathin selective layers formed by the above described methods.

Also disclosed are the composite filtration membranes comprising the ultrathin selective layers. In an embodiment the composite filtration membrane is suitable for ultrafiltration and has a molecular weight cutoff of about 1,000 Daltons to 500,000 Daltons. The composite filtration membranes prepared with the ultrathin crosslinked selective layer exhibit excellent anti-fouling and anti-microbial properties while retaining a commercially useful level of water permeability.

The following examples illustrate the practice of the invention.

EXAMPLES

Examples 1 and 2 describe the preparation of crosslinkable poly(methacrylate)s P-1 and P-2. The crosslinkable poly(methacrylate)s comprise a first repeat unit derived from 2-aminoethyl methacrylate hydrochloride (AEMA-HCL) for crosslinkability, repeat units comprising side chains of poly(ethylene oxide) (PEG) chain segments derived from poly(ethylene glycol)methyl ether methacrylate (MPEGMA) for bio-fouling resistance, and either a repeat unit comprising a zwitterionic side chain (P-1) or a cationic side chain (P-2), for anti-microbial functionality and anti-fouling resistance. Example 3 describes the preparation of a thermoreverisble crosslinkable polymer, P-3, from AEMA-HCL and isopropyl acrylamide. Each of these crosslinkable polymers was coated on an ultrafiltration support membrane and interfacially crosslinked using a di- or trifunctional acid chloride crosslinking agent to provide a crosslinked selective layer comprising amide linking groups.

Materials referenced in the following examples are listed in Table 2.

TABLE 2

| NAME | DESCRIPTION | SUPPLIER |
| --- | --- | --- |
| AEMA-HCl | 2-Aminoethyl Methacrylate Hydrochloride Salt | Aldrich |
| SBMA | Sulfobetaine Methacrylate (N,N-dimethyl-N-methacryloxyethyl-N-(3-sulfo-propyl)ammonium sulfobetaine) | Aldrich |
| AMPA-2HCl | 2,2'-Azobis(2-Methypropion-Amidine) Dihydrochloride; initiator | Aldrich |
| DMAEMA-MI | 2-Dimethylaminoethyl Methacrylate•Methyl Iodide Salt | Aldrich |
| NBOCEA | Nboc Ethyl Methacrylate | IBM |
| NIPAM | N-Isopropyl Acrylamide | Aldrich |
| IPC | Iso-Phthaloyl Chloride (Crosslinking Agent) | Aldrich |
| HEMA | Hydroxyethyl Methacrylate | Aldrich |
| MPEGMA | Poly(Ethylene Glycol) Methyl Ether Methacrylate (Mn = 475 G/Mol) | Aldrich |
| MMA | Methyl Methacrylate | Aldrich |
| PGMEA | Propylene Glycol Methyl Ether Acetate | Aldrich |
| PSF | Polysulfone membrane, Model Number PS20 for ultrafiltration. Performance properties: water flux 900 (Lmh/bar), Marker = 20K dalton poly(ethylene glycol), % Marker Rejection = 95% at 30 psi/25° C./2000 ppm Marker; pore size about 0.1 micrometers | Sepro Membranes |
| PEGDA | Poly(ethylene glycol) diacrylate | Aldrich |
| IRGACURE 184 | 1-Hydroxy Cyclohexyl Phenyl Ketone; UV Photoinitiator | BASF |
| DC193 | DC-193 Silicone Based Copolymer Surfactant | Dow Corning |

Example 1

Synthesis of Amine-Functional Anti-Fouling Polymer, P-1

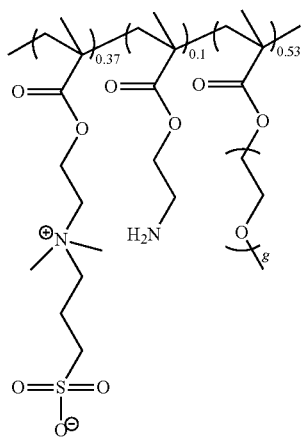

P-1

Water-soluble anti-fouling crosslinkable polymer P-1 was synthesized by free-radical polymerization. To a 250-ml three neck round bottom flask equipped with a magnetic stir bar and a condenser, 0.72 g (4.35 mmol) of 2-aminoethyl methacrylate hydrochloride salt (AEMA-HCl), 4.29 g (15.35 mmol) of sulfobetaine methacrylate (SBMA), 10.40 g (22.1 mmol) of poly(ethylene glycol)methyl ether methacrylate (MPEGMA), Mn=475 g/mol (Mn is the number average molecular weight), 50 ml deionized water and 1.16 g (4.28 mmol) of 2,2 azobis(2-methypropion-amidine)dihydrochloride (AMPA-2HCl) were added. The reaction mixture was stirred for 24 hours at 70° C. to obtain the hydrophilic random copolymer P-1 as shown. The reaction mixture was diluted with deionized water to obtain a 2 wt. % solution. The pH of the resulting polymer solution was about 5.6. A few drops of saturated potassium carbonate were added to the polymer solution such that the pH was about 9.5. The resulting polymer solution was filtered through a filter paper and then used to fabricate a coating layer on UF membrane without further modification. The subscripts in the chemical structure of P-1 indicate relative moles.

Example 2

Synthesis of Amine-Functional Antimicrobial Polymer, P-2

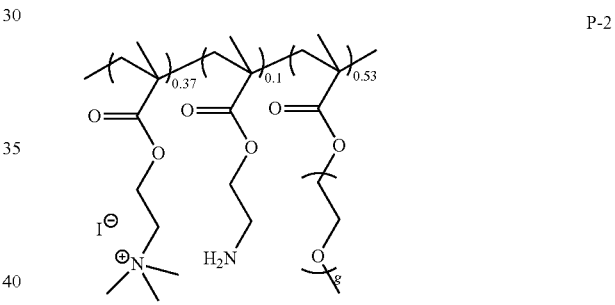

P-2

Water-soluble antifouling crosslinkable polymer P-2 was synthesized by free-radical polymerization. To a 250-ml three neck round bottom flask equipped with a magnetic stir bar and a condenser, 0.72 g (4.35 mmol) of 2-aminoethyl methacrylate hydrochloride salt (AEMA-HCl), 4.60 g (15.38 mmol) of diethyl aminoethyl methacrylate methyl iodide salt (DMAEMA-MI), 10.40 g (21.90 mmol) of polyethylene glycol methyl ether methacrylate (MPEGMA), Mn=475, 50 ml deionized water and 1.16 g (4.28 mmol) of 2,2-azobis(2-methypropion-amidine)dihydrochloride (AMPA.2HCl) were added. The reaction mixture was stirred for 24 hours at 70° C. to obtain the hydrophilic random copolymer P-2. The resulting reaction mixture was diluted in deionized water to obtain a 2 wt. % solution. The pH of the polymer solution was about 5.5. A few drops of saturated potassium carbonate were added to the polymer solution such that the pH was about 9.5. The resulting polymer solution was filtered through a filter paper and then used to fabricate a coating layer on UF membrane without further modification. The subscripts in the chemical structure of P-2 indicate relative moles.

Example 3

Synthesis of Amine Functional Thermoresponsive Polymer, P-3

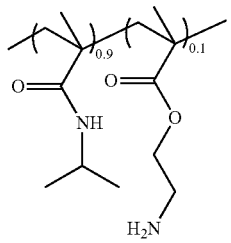

Water-soluble thermoresponsive crosslinkable polymer P-3 was synthesized by free-radical polymerization. To a 250-ml three neck round bottom flask equipped with a magnetic stir bar and a condenser, 0.50 g (2.17 mmol) of NBoc ethyl methacrylate (NBOCEA), 2.36 g (20.9 mmol) of N-isopropyl acrylamide (NIPAM), 10 ml of THF and 0.152 g of AIBN were added. The reaction mixture was stirred for 24 hours at 70° C. to obtain the copolymer. The THF was evaporated under vacuum and the resulting polymer was dissolved in 20 ml of trifluoroacetic acid:DCM mixture (50:50). The mixture was stirred for 24 hours and the TFA:DCM mixture was removed under vacuum to obtain the salt form of the random copolymer. The copolymer was dissolved in water and neutralized with saturated potassium carbonate to obtain the amine functional thermoresponsive material P-3, wherein the subscripts in the chemical structure of P-3 indicate relative moles.

Example 4

Fabrication of Composite Filtration Membrane by Interfacial Polymerization of Polymer P-1 (Example 1)

Figure 3:
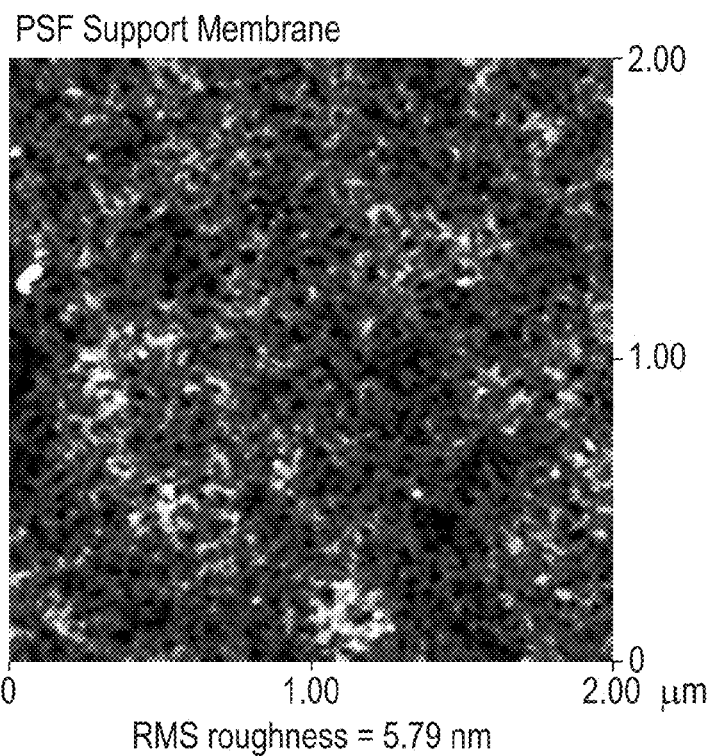
FIG. 3 is a photograph of an atomic force microscope image of the surface of a polysulfone support membrane.
Figure 4:
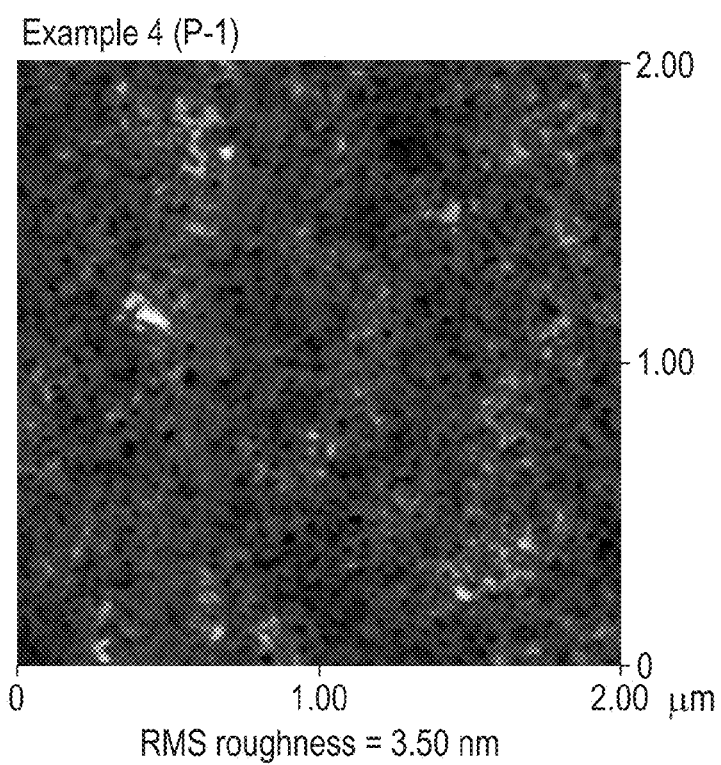
FIG. 4 is a photograph of an atomic force microscope image of the surface of the composite filtration membrane of Example 4, made by interfacially crosslinking polymer P-1 with isophthaloyl chloride. The selective layer comprising the crosslinked polymer was too thin to be measured.

A hydrophilic anti-fouling coating was formed by interfacial polymerization on a commercial PSF ultrafiltration membrane (model number PS20, polysulfone, sold by Sepro Membranes) using an aqueous solution of the polymer described in Example 1, which was with isophthaloyl chloride (IPC) dissolved in an organic solvent (e.g., hexanes). Specifically, the PSF membrane was placed in a 2 wt. % aqueous solution of the crosslinkable polymer P-1 in Example 1 for two minutes. Excess solution was drained from the dip-coated surface and the membrane was placed on a lint-free cloth with the polysulfone layer at the air interface. The surface was treated twice with a rubber roller (VWR part #60941-118) to remove excess solution. The resulting membrane was 12.7 cm×12.7 cm and was used immediately without further drying. The layer was immersed in a 0.5 wt. % solution of isophthaloyl chloride in hexanes for 5 minutes at ambient temperature, after which the membrane was dried and rinsed. The thickness of the crosslinked layer was too thin to be measured. FIGS. 3 and 4 are atomic force microscope images of the surface of the PSF support membrane and the composite membrane of Example 4, respectively.

Example 5

Fabrication of Composite Membrane by Interfacial Polymerization of P-2 (Example 2)

The procedure described in Example 4 was used to prepare a composite membrane with the polymer P-2 prepared in Example 2.

Example 6

Fabrication of Composite Membrane by Interfacial Polymerization of P-3 (Example 3)

The procedure described in Example 4 was used to prepare a composite membrane with the thermally responsive polymer P-3 prepared in Example 3.

Testing Results.
Permeation Flux Versus Time. PSF Support Membrane Versus Composite Membrane Example 4.

The water permeability performance of the composite membrane of Example 4 (formed by crosslinking P-1), and untreated PSF ultrafiltration membrane were studied using an oil/water emulsion crossflow filtration system. An appropriate amount of soybean/canola oil (Wesson) and DC193 surfactant (sold by Dow Corning, Inc., Midland Mich. US) were combined in a ratio of 9:1 (oil/surfactant, w/w), added to 3 L of pre-filtered deionized water, and blended together in a steel vessel. To ensure a stable emulsion, the mixture of water, surfactant, and oil was emulsified for 3 min at the highest rotational speed (~20,000 rpm) of the blender (Waring LBC15, Torrington, Conn.). The emulsions were then stored at room temperature and used within 24 hours. The concentration of organics in the water (i.e., oil plus organic components of the surfactant) was 1500 ppm. The total organic carbon content of these oil/water emulsions was determined using TOC. Crossflow fouling experiments were conducted using a commercial crossflow membrane filtration system (Separation Systems Technologies, San Diego, Calif.) that can test three membranes simultaneously at pressures up to 20 bar. Membranes were loaded on the three cell cross-flow filtration system with parallel configuration, and were challenged with the oil-in-water emulsion at 25° C. The crossflow rate was 1.32 liters/min (0.35 gal/min) at 7.03 kgf/cm$^2$ (100 psi) for 5 hours. Permeate flux was recorded as a function of time by digital balances connected to a computer. FIG. 5 is a graph comparing the permeate flux as a function of operation time of the composite membrane of Example 4 and the uncoated PSF membrane. The water flux of the uncoated PSF membrane is significantly lower, which indicates severe oil fouling (bottom plot). The Example 4 membrane exhibits less fouling and retains much higher flux than the uncoated PSF membrane.

Pressure Differential with Time. PSF Support Membrane Versus Composite Membranes Examples 4 and 5.

FIG. 6 is a graph showing the pressure differential across several membranes as a function of time using a cross-flow filtration setup using the above-described 1500 ppm oil in water emulsion. The permeate flux for each membrane was kept constant at 2 mL/minute. It can be seen that the transmembrane pressure drop for the untreated PSF membrane is a much higher than the composite membranes Examples 4 and 5, with Example 4, containing zwitterionic polymer P-1, being most advantageous. This indicates that the treated membranes have lower organic fouling than the untreated PSF membrane.

Bio-Fouling (Flux Recovery). PSF Support Membrane Versus Composite Membrane Example 4.

Irreversible protein fouling was determined by comparing the pure water permeance of the composite membrane of Example 4 before and after a protein fouling (adsorption) experiment. Before a fouling experiment, the pure water flux ($P_{w,o}$) of the membranes was determined at 10 psi with a dead-end filtration cell (Advantec MFS, #UHP 43, Dublin, Calif., USA). A fouling experiment (protein adsorption experiment) was then performed on the membrane with 1000 ppm Bovine Serum Albumin solution including 0.1 M phosphate buffer (pH 7.4) for 4.5 hours. After the protein fouling experiment, the filtration cell was depressurized and the membrane was rinsed with deionized water at least three times. The post-fouling pure water flux ($P_{w,f}$) was recorded after the rinsing cycle. Water flux recovery index was then calculated by dividing $P_{w,f}$ by $P_{w,o}$. The composite membrane of Example 4 showed higher flux recovery index (0.78) compared to an uncoated PSF membrane (0.45) indicating that the interfacially crosslinked material reduces irreversible bio-fouling of the membrane surface.

The above examples demonstrate that a commercial PSF ultrafiltration membrane can be surface modified with an exceptionally thin crosslinked poly(meth)acrylate or poly(meth)acrylamide layer, which is formed by interfacially crosslinking an initial film layer of a water-compatible crosslinkable polymer, thereby providing improved anti-fouling behavior.

Comparative Examples Prepared from Poly(Ethylene Glycol)Di(Meth)Acrylate Monomer PEGDA As described further above, one common way PEG-based materials are used commerically in preparing filtration membranes is to coat a poly(ethylene glycol)di(meth)acrylate monomer and a photoinitiator on a support membrane. This layer is then exposed to ultraviolet radiation to obtain a crosslinked PEG functional poly(meth)acrylate layer. However, it is difficult to obtain extremely thin layers (less than 100 nm thickness) on a porous support membrane using these materials. Methods that rely on diluting a PEG-functional monomer with a non-reactive solvent such as ethanol to achieve a thinner layer of crosslinked PEG-containing polymer risk permanent blockage of the pores, resulting in extremely low flux. Hence, this method is not desirable for fabricating thin anti-fouling/antimicrobial coatings on membranes. The deficiencies associated with this method are illustrated in the following comparative examples 1 to 6, summarized in Table 3 below. In comparative examples 2 to 4, the PEGDA monomer/photoinitiator was coated using a drawdown applicator.

Comparative Example 1

Untreated Sepro PSF UF membrane (PS20) was characterized for pure water flux at 10 psi with a dead-end filtration cell (Advantec MFS, #UHP 43, Dublin, Calif., USA).

Comparative Example 2

Solvent-Free PEGDA Coating Mixture

In a 20 ml amber glass vial equipped with a stir bar, 2.0 g of poly(ethylene glycol)diacrylate (PEGDA), Mn=700 g/mol, and 0.02 g (0.098 mmol) of IRGACURE 184 (a trademark of Ciba-Geigy Corporation, now BASF, White Plains N.Y.) were added. The mixture was stirred for 10 minutes at room temperature to ensure complete dissolution of the photoinitiator in PEGDA. The sample was coated using a Gardco drawdown applicator with 1 mil clearance on a Sepro PSF UF membrane (PS20). The resulting layer was crosslinked by UV radiation for 5 minutes under 312 nm UV irradiation at 3.0 mW/cm$^2$ to form the composite membrane. The membrane was stored in deionized water for 18 hours before testing. The pure water flux ($P_{w,o}$) of the membranes was determined at 10 psi with a dead-end filtration cell (Advantec MFS, #UHP 43, Dublin, Calif., USA). FIG. 7 is a cross-sectional scanning electron micrograph (SEM) image of the composite membrane of Comparative Example 2. The pores of the PSF support membrane are clogged.

Comparative Example 3

PEGDA:Ethanol Weight Ratio 1:1

In a 20 ml amber glass vial equipped with a stir bar, 2.0 g of poly(ethylene glycol)diacrylate (PEGDA), Mn=700 g/mol, 2 g of ethanol, 0.02 g (0.098 mmol) of IRGACURE 184 were added. The mixture was stirred for 10 minutes at room temperature to ensure complete dissolution of the photoinitiator in PEGDA. The sample was coated using a Gardco drawdown applicator with 1 mil clearance on a Sepro PSF UF membrane (PS20) and ethanol was allowed to evaporate at RT for 15 minutes. The resulting layer was crosslinked by UV radiation for 5 minutes under 312 nm UV irradiation at 3.0 mW/cm$^2$ to form the composite membrane. The membrane was stored in deionized water for 18 hours before testing. The pure water flux ($P_{w,o}$) of the membranes was determined at 10 psi with a dead-end filtration cell (Advantec MFS, #UHP 43, Dublin, Calif., USA). FIG. 8 is a cross-sectional SEM image of the composite membrane of Comparative Example 3, and shows a thick coating of the crosslinked polymer layer.

Comparative Example 4

PEGDA:Ethanol Weight Ratio 1:3

In a 20 ml amber glass vial equipped with a stir bar, 1.0 g of poly(ethylene glycol)diacrylate (PEGDA), Mn=700 g/mol, 3.0 g of ethanol and 0.01 g (0.049 mmol) of IRGACURE 184 were added. The mixture was stirred for 10 minutes at room temperature to ensure complete dissolution of the photoinitiator in PEGDA. The sample was coated using a Gardco drawdown applicator with 1 mil clearance on a Sepro PSF ultrafiltration membrane (model number PS20, Sepro Membranes). The resulting layer was crosslinked by UV radiation for 5 minutes under 312 nm UV irradiation at 3.0 mW/cm$^2$ to form the composite membrane. The composite membrane was stored in deionized water for 18 hours before testing. The pure water flux ($P_{w,o}$) of the membranes was determined at 10 psi with a dead-end filtration cell (Advantec MFS, #UHP 43, Dublin, Calif., USA). FIG. 9 is a cross-sectional SEM of the composite membrane of Comparative Example 4. The thickness of the crosslinked polymer layer is about 637 nm.

Comparative Example 5

PEGDA:Ethanol Weight Ratio about 2:98

A PSF ultrafiltration membrane was dipped in a 100 ml solution of 2 weight % PEGDA, Mn=700 g/mol and 0.02 g of IRGACURE 184 in ethanol for four minutes. Excess solution was drained from the dip-coated surface and the membrane was placed on a lint-free cloth with the polysulfone layer at the air interface. The surface was treated twice with a rubber roller (VWR part #60941-118) to remove excess solution and the membrane was allowed to dry at room temperature for 10 minutes. The resulting membrane was exposed to UV-radiation to crosslink the PEGDA layer. The composite membrane was stored in deionized water for 3 hours before testing the pure water flux ($P_{w,o}$) of the membranes was determined at 0 psi with a dead-end filtration cell (Advantec MFS, #UHP 43, Dublin, Calif., USA).

Comparative Example 6

Repeat PEGDA:Ethanol Weight Ratio about 2:98

Comparative Example 5 was repeated, except the excess PEGDA solution was swabbed from the surface of the ultrafiltration membrane using a sheet of KIMWIPES, sold by Kimberly Clark Corporation of Delaware. The pores were irreversibly plugged after crosslinking by UV exposure. FIG. 10 is a cross-sectional SEM of the composite membrane of Comparative Example 6. The thickness of the crosslinked polymer layer is about 1 micrometer. The pores of the PSF support membrane are clogged.

TABLE 3

| Example | Pressure (psi) | Flux (Lmh) |
|---|---|---|
| Comparative Ex. 1 | 10 | 1400 |
| Comparative Ex. 2 | 10 | 9 |
| Comparative Ex. 3 | 10 | 56 |
| Comparative Ex. 4 | 10 | No Flux |
| Comparative Ex. 5 | 0 | 2100 |
| Comparative Ex. 6 | 10 | 0 |
| Example 4 (P-1)* | 10 | 690 |
| Example 5 (P-2)* | 10 | 577 |

*Polymers crosslinked with acid chlorides according to the procedure of Example 4.

Comparative Example 7

Interfacial Formation of a Polyamide Membrane from m-phenylenediamine and TMC

As described further above, another method used in the industry to form reverse osmosis membranes utilizes interfacial polymerization of two monomers coated in separate layers. As one example an aqueous layer containing m-phenylenediamine monomer is contacted with a layer comprising trimesoyl chloride (TMC) dissolved in an organic solvent to form a polyamide discriminating layer on a PSF support membrane. The polyamide layer is usually less than 200 nm thick and is used for brackish and seawater desalination. However, composite membranes comprising these polyamide layers are known to easily foul. Unfortunately, this method of forming a discriminating layer from monomers allows little flexibility in adjusting the composition of the discriminating layer. For example, no primary amine functional zwitterionic monomers are available to interfacially polymerize in this manner. Moreover, existing monoamine functional PEG monomers cannot be crosslinked using this method. The following example illustrates the fouling behavior of a composite membrane formed by interfacial polymerization of two monomers, m-phenylenediamine and trimesoyl chloride (TMC) on a polysulfone support membrane, to compare with Example 4.

An interfacially polymerized coating was formed on a commercial PSF ultrafiltration membrane (model number PS20, polysulfone, sold by Sepro Membranes). Specifically, the PSF membrane was placed in a 2 wt. % aqueous solution of 1,3-phenylenediamine for two minutes. Excess solution was drained from the dip-coated surface and the membrane was placed on a lint-free cloth with the polysulfone layer at the air interface. The surface was treated twice with a rubber roller (VWR part #60941-118) to remove excess solution. The resulting membrane was 12.7 cm×12.7 cm and was used immediately without further drying. The layer was immersed in a 0.5 wt. % solution of isophthaloyl chloride in hexanes for 1 minute at ambient temperature, after which the membrane was dried and rinsed. The thickness of the crosslinked layer was too thin to be measured.

The water permeability performance of the composite membrane of Comparative Example 7 was measured using an oil/water emulsion crossflow filtration system. An appropriate amount of n-decane and DC193 surfactant sold by Dow Corning, Inc., Midland, Mich., US) were combined in a ratio of 9:1 (oil/surfactant, w/w), added to 3 L of pre-filtered deionized water, and blended together in a steel vessel. To ensure a stable emulsion, the mixture of water, surfactant, and oil was emulsified for 3 min at the highest rotational speed (~20,000 rpm) of the blender (Waring LBC15, Torrington, Conn.). The emulsions were then stored at room temperature and used within 24 hours. The concentration of organics in the water (i.e., oil plus organic components of the surfactant) was 150 ppm. The total organic carbon content of these oil/water emulsions was determined using TOC. Crossflow fouling experiment was conducted using a commercial crossflow membrane filtration system (Separation Systems Technologies, San Diego, Calif.) that can test three membranes simultaneously at pressures up to 20 bar. Membrane was loaded on the three cell cross-flow filtration system with parallel configuration, and were challenged with the oil-in-water emulsion at 25° C. The crossflow rate was 1.32 liters/min (0.35 gal/min) at 14.06 kgf/cm$^2$ (200 psi) for 5 hours. Permeate flux was recorded as a function of time by digital balances connected to a computer, resulting in the plot depicted in the graph of FIG. 11, which can be compared to FIG. 5 (upper plot) for Example 4, performed at 100 psi for 5 hours. Table 4 summarizes the crossflow data for Comparative Example 7 and Example 4 at a 1.32 liters/min flow rate.

TABLE 4

| Example | PPM (decane/surfactant) | Pressure (psi) at 1.32 L/min crossflow rate |
|---|---|---|
| Comparative Example 7 | 150 | 200 |
| Example 4 (P-1) | 1500 | 100 |

As shown in Table 4, the composite membrane of Example 4 prepared by interfacially crosslinking polymer P-1 obtains a crossflow rate of 1.32 L/min at half the pressure using an oil/surfactant emulsion that is ten times more concentrated in oil/surfactant than the emulsion used for Comparative Example 7. These results demonstrate the superior anti-fouling and water permeability characteristics of the Example 4 selective layer.

In summary, the disclosed methods of preparing selective layers for composite filtration membranes by interfacially crosslinking a water-compatible polymer film layer has advantages in design and performance flexibility. The disclosed methods allow for the incorporation of many useful functional groups into the crosslinked network, including cationic side chain groups, zwitterionic side chain groups, and/or poly(alkylene oxide) groups. The ultrathin layers provide anti-fouling properties while allowing for high water permeability. Applying the initial film layer from water is also conducive to large scale manufacturing. Using the disclosed methods, the permeability, anti-fouling behavior, anti-microbial properties, salt rejection characteristics, and other properties can be tuned for a specific fluid filtration application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A composite filtration membrane, comprising:
a porous support membrane layer; and
an anti-fouling selective layer disposed on the porous support membrane layer; the selective layer comprising a interfacially crosslinked polymer of formula (15):

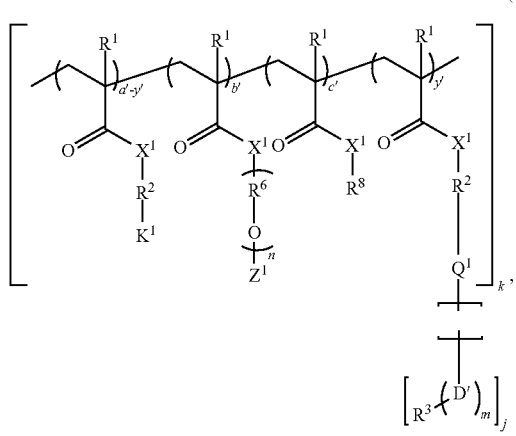

wherein
  each —$R^1$ is independently a hydrogen or a methyl group,
  —$R^2$— is a linear, branched or cyclic divalent radical selected from the group consisting of alkylenes, fluoroalkylenes, arylenes, arylalkylenes, alkylarylenes, and silicon containing groups,
  —$R^3$ is a bridging group having a valency of m and comprising 1 to 10,000 carbons,
  —$X^1$— is a divalent radical selected from the group consisting of —O—, —N(H)—, and —N($R^5$)—,
  —$R^5$ is a monovalent radical comprising 1 to 20 carbons,
  m is a positive integer greater than or equal to 2,
  j represents the number of bridging groups $R^3$ which are bound to one backbone of the crosslinked polymer, j being greater than or equal to 1,
  k represents the number of backbones of the crosslinked polymer which are bound to one bridging group $R^3$, k being greater than or equal to 2,
  a', b', c', and y' are positive numbers,
  n is a positive integer greater than 1,
  —$K^1$ is a monovalent radical selected from the group consisting of —$NH_2$— and —N(H)($R^4$)—,
  —$R^4$ is a monovalent radical comprising 1 to 50 carbons,
  —$R^6$— is a divalent radical selected from the group consisting of a ethylene, 2-propylene, butylene, and combinations thereof,
  —$Z^1$ is a monovalent radical selected from the group consisting of —H, —$R^7$, -$L^1$-$NH_2$, -$L^1$-N(H)($R^7$), -$L^1$-N($R^7$)$_2$, and hydrogen salt forms of any of the foregoing amine groups,
  —$R^7$ is a monovalent hydrocarbon radical comprising 1 to 20 carbons,
  -$L^1$- is a divalent radical comprising 1 to 20 carbons,
  —$R^8$ is a cationic monovalent radical comprising a member selected from the group consisting of quaternary amine salts, sulfonium salts, phosphonium salts, and combination thereof, wherein —$R^8$ has a net positive charge,
  -D'-$Q^1$- is a divalent linking group selected from the group consisting of amides, sulfonamides, sulfinamides, and functional groups having a phosphorous-nitrogen bond,
  -$Q^1$- is a divalent radical independently selected from the group consisting of —N(H)— and —N($R^4$)—,
  —$R^4$ is a monovalent radical comprising 1 to 50 carbons, and
  -D'- is a divalent radical independently selected from the group consisting of —C(=O)—, —S(=O)$_2$—, and —S(=O)—, and groups comprising a phosphorous bonded to a nitrogen of -$Q^1$-.

2. The composite membrane of claim 1, wherein $R^1$ is methyl.

3. The composite membrane of claim 1, wherein a'–y'>0, —$R^2$— is alkylene, and —$K^1$ is —$NH_2$.

4. The composite membrane of claim 1, wherein —$R^8$ comprises a sulfonium salt.

5. The composite membrane of claim 1, wherein —$R^8$ comprises a phosphonium salt.

6. The composite membrane of claim 1, wherein —$R^8$ comprises a quaternary amine salt.

7. The composite membrane of claim 1, wherein —$X^1$—$R^8$ is

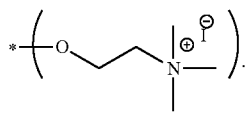

8. The composite membrane of claim 1, wherein b'=0, and —$X^1$—$R^8$ is

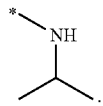

9. The composite membrane of claim 1, wherein m=2 and $R^3$-$[D']_m$ is an isophthaloyl group:

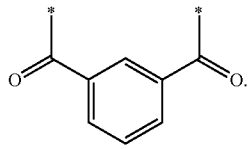

10. The composite membrane of claim 1, wherein a'-y'=0, —$X^1$— is —O—, -D'-$Q^1$- is —C(=O)—N(H)—, —$R^6$— is ethylene (—$CH_2CH_2$—), and —$R^8$ comprises a quaternary amine salt, wherein —$R^8$— has a net positive charge.

11. The composite membrane of claim 1, wherein a'-y'=0, —$X^1$— is —O—, -D'-$Q^1$- is —C(=O)—N(H)—, —$R^6$— is ethylene (—$CH_2CH_2$—), and —$X^1$—$R^8$ is

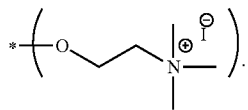

12. The composite filtration membrane of claim 1, wherein the composite membrane is suitable for ultrafiltration of an aqueous mixture.

13. The composite filtration membrane of claim 1, wherein the selective layer has a thickness of greater than 0 nm and less than or equal to 50 nm.

14. A composite filtration membrane, comprising:
a porous support membrane layer; and
an anti-fouling selective layer disposed on the porous support membrane layer; the selective layer comprising a interfacially crosslinked polymer of formula (16):

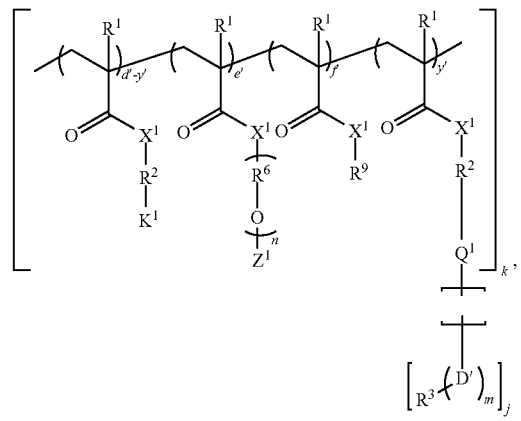

wherein
each —$R^1$ is independently a hydrogen or a methyl group,
—$R^2$— is a linear, branched or cyclic divalent radical selected from the group consisting of alkylenes, fluoroalkylenes, arylenes, arylalkylenes, alkylarylenes, and silicon containing groups,
—$R^3$ is a bridging group having a valency of m and comprising 1 to 10,000 carbons,
—$X^1$— is a divalent radical selected from the group consisting of —O—, —N(H)—, and —N($R^5$)—,
—$R^5$ is a monovalent radical comprising 1 to 20 carbons,
m is a positive integer greater than or equal to 2,
j represents the number of bridging groups $R^3$ which are bound to one backbone of the crosslinked polymer, j being greater than or equal to 1,
k represents the number of backbones of the crosslinked polymer which are bound to one bridging group $R^3$, k being greater than or equal to 2,
d', e', f', and y' are positive numbers,
n is a positive integer greater than 1,
—$K^1$ is a monovalent radical selected from the group consisting of —$NH_2$— and —NH($R^4$)—,
—$R^4$ is a monovalent radical comprising 1 to 50 carbons,
—$R^6$— is a divalent radical selected from the group consisting of a ethylene, 2-propylene, butylene, and combinations thereof,
—$Z^1$ is a monovalent radical selected from the group consisting of —H, —$R^7$, -$L^1$-$NH_2$, -$L^1$-$NHR^7$, -$L^1$-$N(R^7)_2$, and hydrogen salt forms of any of the foregoing amine groups,
—$R^7$ is a monovalent radical comprising 1 to 20 carbons,
-$L^1$- is a divalent radical comprising 1 to 20 carbons,
—$R^9$ is a zwitterionic monovalent radical comprising i) a cationic group selected from the group consisting of quaternary amines, sulfonium groups, phosphonium groups, and combinations thereof, and ii) an anionic group selected from the group consisting of carboxylate (—$CO_2^-$), sulphonate (—$SO_3^-$), and sulfinate (—$SO_2^-$), wherein —$R^9$— has a net zero charge, -D'-Q$^1$- is a divalent linking group selected from the group consisting of amides, sulfonamides, sulfinamides, and functional groups having a phosphorous-nitrogen bond, -Q$^1$- is a divalent radical selected from the group consisting of —N(H)— and —N(R$^4$)—, —R$^4$ is a monovalent radical comprising 1 to 50 carbons, and -D'- is a divalent radical independently selected from the group consisting of —C(=O)—, —S(=O)$_2$—, and —S(=O)—, and groups comprising a phosphorous bonded to a nitrogen of -Q$^1$-.

15. The composite membrane of claim 14, wherein —R$^9$ comprises a quaternary amine group and a sulfonate group (—SO$_3$$^-$).

16. The composite membrane of claim 14, wherein —R$^9$ comprises a quaternary amine group and a carboxylate group (—CO$_2$$^-$).

17. The composite membrane of claim 14, wherein —R$^9$ comprises a phosphonium group and a carboxylate group (—CO$_2$$^-$).

18. The composite membrane of claim 14, wherein m=2 and R$^3$-[D']$_m$ is an isophthaloyl group:

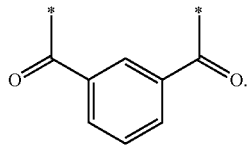

19. The composite membrane of claim 14, wherein —X$^1$— is —O—, —R$^6$— is ethylene, -D'-Q$^1$- is —C(=O)—N(H)—, and —R$^9$ comprises i) a quaternary amine group and ii) a sulfonate group (—SO$_3$$^-$).

20. The composite membrane of claim 14, wherein —C(=O)—X$^1$—R$^9$— is selected from the group consisting of

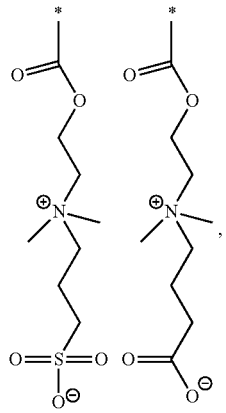

and combinations thereof.

21. The composite membrane of claim 14, wherein d'-y'=0, —X$^1$— is —O—, -D'-Q$^1$- is —C(=O)—N(H)—, —R$^6$— is ethylene (—CH$_2$CH$_2$—), and —X$^1$—R$^8$ is

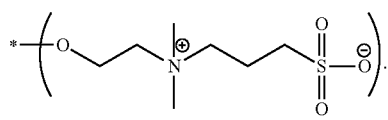

22. The composite membrane of claim 14, wherein d'-y'>0, —R$^2$— and —R$^6$— are ethylene (—CH$_2$CH$_2$—), —K$^1$ is —NH$_2$, Q$^1$ is —NH—, —Z$^1$ is methyl, and X$^1$—R$^8$ is

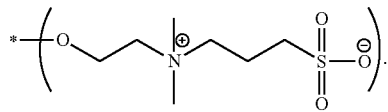

23. The composite membrane of claim 14, wherein the porous support membrane comprises polysulfone.

* * * * *